(12) United States Patent
Williams et al.

(10) Patent No.: US 12,282,774 B2
(45) Date of Patent: Apr. 22, 2025

(54) VECTOR PROCESSOR UTILIZING MASSIVELY FUSED OPERATIONS

(71) Applicant: Intel Corporation, Santa Clara, CA (US)

(72) Inventors: Joseph Williams, Holmdel, NJ (US); Zoran Zivkovic, Hertogenbosch (NL); Jian-Guo Chen, Basking Ridge, NJ (US); Hong Wan, Allentown, PA (US); David Dougherty, Allentown, PA (US); Jay O'neill, Nesquehoning, PA (US)

(73) Assignee: Intel Corporation, Santa Clara, CA (US)

( * ) Notice: Subject to any disclaimer, the term of this patent is extended or adjusted under 35 U.S.C. 154(b) by 790 days.

(21) Appl. No.: 17/358,231

(22) Filed: Jun. 25, 2021

(65) Prior Publication Data

US 2023/0004389 A1    Jan. 5, 2023

(51) Int. Cl.
*G06F 9/30*          (2018.01)

(52) U.S. Cl.
CPC ...... *G06F 9/30123* (2013.01); *G06F 9/30036* (2013.01)

(58) Field of Classification Search
CPC ............ G06F 9/30036; G06F 9/30123; G06F 9/30109; G06F 9/35
See application file for complete search history.

(56) References Cited

U.S. PATENT DOCUMENTS

| | | | | |
|---|---|---|---|---|
| 9,355,114 | B1* | 5/2016 | Zilleruelo-Ramos ... | H03M 7/70 |
| 2003/0028754 | A1* | 2/2003 | Sugimoto ........... | G06F 9/30192 |
| | | | | 712/225 |
| 2014/0047214 | A1* | 2/2014 | Fleischer ................ | G06F 9/345 |
| | | | | 711/E12.078 |
| 2014/0244970 | A1* | 8/2014 | Nilsson ................. | G06F 9/3888 |
| | | | | 712/7 |
| 2016/0004665 | A1* | 1/2016 | Elmer ................... | G06F 7/4876 |
| | | | | 708/520 |
| 2018/0322390 | A1* | 11/2018 | Das ........................ | G06F 17/16 |

FOREIGN PATENT DOCUMENTS

WO    WO-2017064455 A1 *  4/2017    ......... G06F 15/8053

* cited by examiner

*Primary Examiner* — Farley Abad
(74) *Attorney, Agent, or Firm* — Banner & Witcoff Ltd.

(57) ABSTRACT

Techniques are disclosed for the use of fused vector processor instructions by a vector processor architecture. Each fused vector processor instruction may include a set of fields associated with individual vector processing instructions. The vector processor architecture may implement local buffers facilitating a single vector processor instruction to be used to execute each of the individual vector processing instructions without re-accessing vector registers between each executed individual vector processing instruction. The vector processor architecture enables less communication across the interconnection network, thereby increasing interconnection network bandwidth and the speed of computations, and decreasing power usage.

17 Claims, 10 Drawing Sheets

FIG. 7B

VECTOR PROCESSOR UTILIZING MASSIVELY FUSED OPERATIONS

TECHNICAL FIELD

The disclosure described herein generally relates to vector processor architectures and, in particular, to techniques for reducing the number of vector processing instructions using a fused vector processor instruction and local buffers accessed by execution units of the vector processor architecture.

BACKGROUND

A vector processor or array processor is a central processing unit (CPU) that implements an instruction set containing instructions that operate on one-dimensional arrays of data referred to as "vectors." This is in contrast to scalar processors having instructions that operate on single data items. Vector processors can greatly improve performance on certain workloads, notably numerical simulation and similar tasks, by utilizing a number of execution units that independently execute specific functions on incoming data streams to achieve a processing flow. However, current implementation of vector processors to achieve a processing flow presents various drawbacks.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the implementations as discussed herein.

FIG. 7B illustrates aligned and unaligned vector data sample access, in accordance with the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the present disclosure. However, it will be apparent to those skilled in the art that the implementations of the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

Vector Processing Operation

Generally speaking, conventional CPUs manipulate one or two pieces of data at a time. For instance, conventional CPUs may receive an instruction that essentially says "add A to B and put the result in C," with 'C' being an address in memory. Typically the data is rarely sent in raw form, and is instead "pointed to" via passing an address to a memory location that holds the actual data. Decoding this address and retrieving the data from that particular memory location takes some time, during which a conventional CPU sits idle waiting for the requested data to be retrieved. As CPU speeds have increased, this memory latency has historically become a large impediment to performance.

Thus, to reduce the amount of time consumed by these steps, most modern CPUs use a technique known as instruction pipelining in which the instructions sequentially pass through several sub-units. The first sub-unit reads and decodes the address, the next sub-unit "fetches" the values at those addresses, while the next sub-unit performs the actual mathematical operations. Vector processors, which are otherwise known as array processors, take this concept even further. For instance, instead of pipelining just the instructions, vector processors also pipeline the data itself. For example, a vector processor may be fed instructions that indicate not to merely add A to B, but to add all numbers within a specified range of address locations in memory to all of the numbers at another set of address locations in memory. Thus, instead of constantly decoding the instructions and fetching the data needed to complete each one, a vector processor may read a single instruction from memory. This initial instruction is defined in a manner such that the instruction itself indicates that the instruction will repeatedly be executed on another item of data, at an address one increment larger than the last. This allows for significant savings in decoding time.

Figure 1:
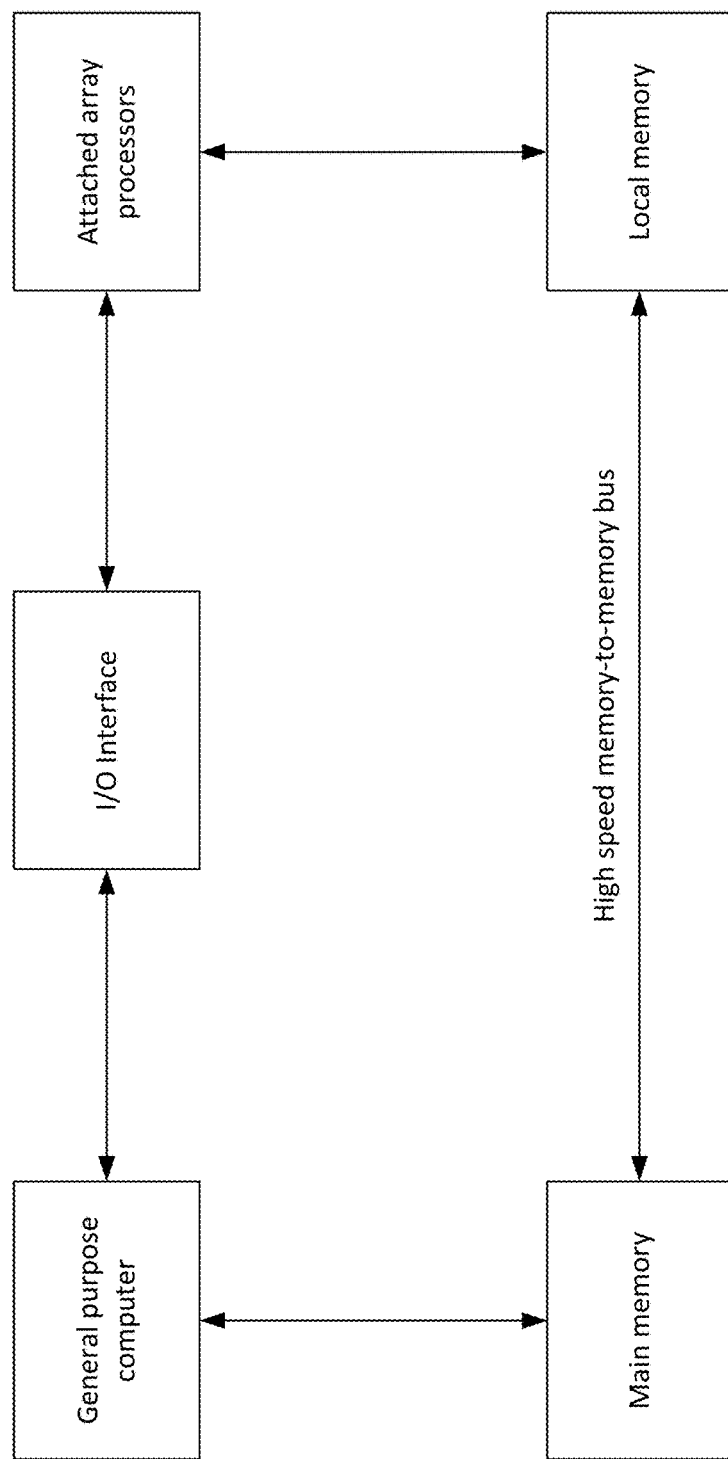
FIG. 1 illustrates an example of a conventional vector processor architecture.
Figure 2:
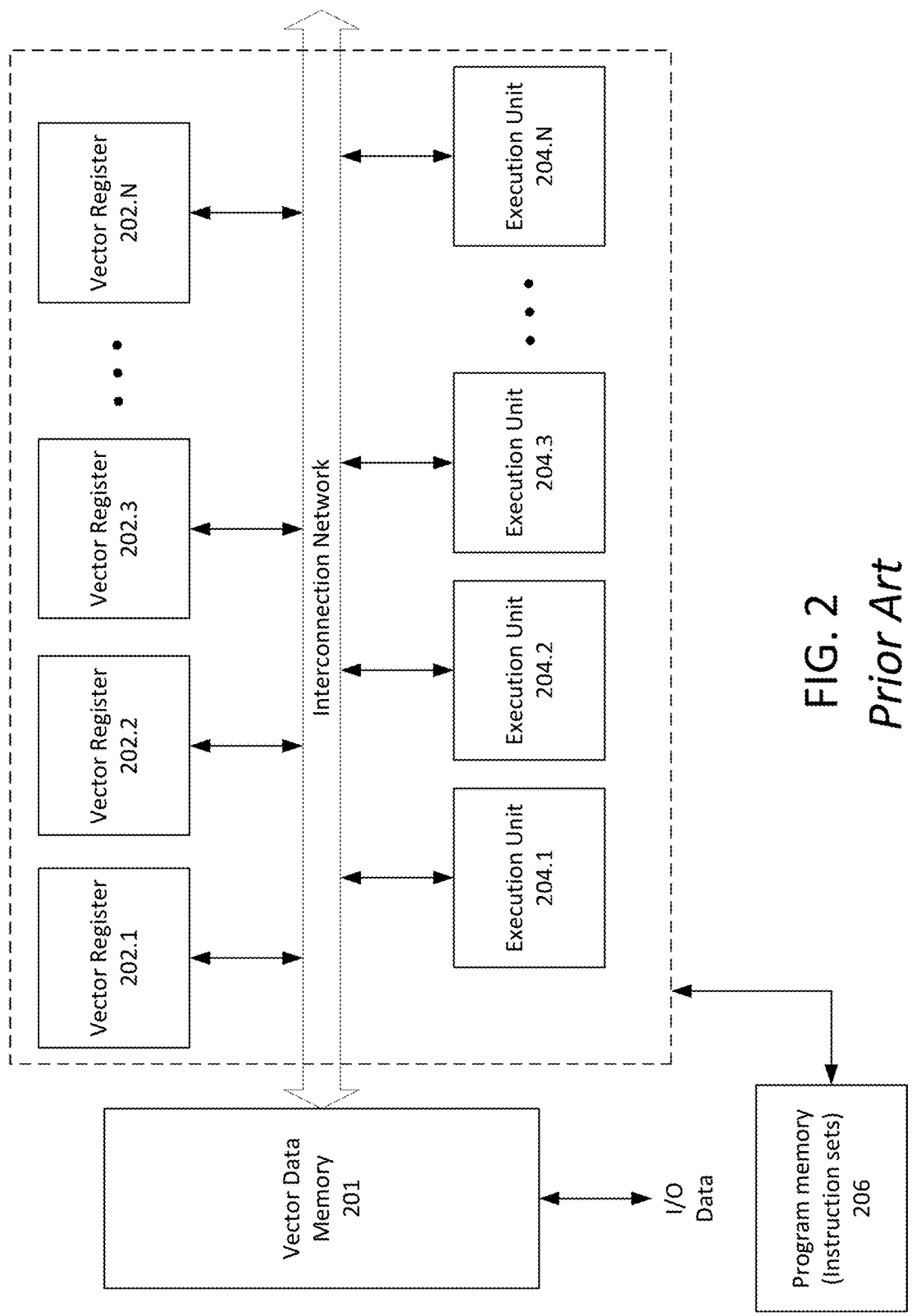
FIG. 2 illustrates another example of a conventional vector processor architecture.

Vector processors may be implemented in accordance with various architectures, and the various vector processor architectures as discussed throughout the disclosure as further described herein may be implemented in accordance with any of these architectures or combinations of these architectures. FIGS. 1 and 2 provide two different implementations of a vector processor architecture. FIG. 1 illustrates an attached vector processor, which is attached to a general purpose computer, for instance, for the purpose of enhancing and improving the performance of that computer in numerical computational tasks. The attached vector processor achieves high performance by means of parallel processing with multiple functional units, which may be alternatively referred to herein as execution units or processing units.

FIG. 2, on the other hand, shows an example of a single instruction stream, multiple data streams (SIMD) vector processor. The vector processor architecture 200 as shown in FIG. 2 may have an architecture consisting of one or more execution units. Each execution unit is capable of executing one instruction. Each instruction can be a control, load/store, scalar or a vector instruction. Therefore, a processor with N execution units 204.1-204.N as shown in FIG. 2 can issue as many as N instructions every clock cycle. The execution units 204.1-204.N function under the control of a common control unit (such as processing circuitry), thus providing a single instruction stream to control each of the execution units 204.1-204.N. The I/O data as shown in FIG. 2 is typically identified with data communicated between the vector processor 200 and another data source or processor (which may be the common control unit or another processor) depending upon the particular application. The vector data memory 201 thus stores data received as input to be processed by the execution units 204.1-204.N, and data that is output or read from the vector data memory 201 after the data is processed. The vector processor architecture 200 as shown in FIG. 2 is an example of a load-store architecture used by vector processors, which is an instruction set architecture that divides instructions into two categories: memory access (loading and storing data between the vector data memory 201 and the vector registers 202.1-202.N) and the vector processing operations performed by the execution units 204.1-204.N using the data retrieved from and the results stored to the vector registers 202.1-202.N.

Thus, the load-store instruction architecture facilitates data stored in the vector data memory 201 that is to be processed to be loaded into the vector registers 202.1-202.N using load operations, transferred to the execution units 204.1-204.N, processed, written back to the vector registers 202.1-202.N, and then written back to the vector data memory 201 using store operations. The location (address) of the data and the type of processing operation to be performed by each execution unit 204.1-204.N is part of an instruction stored as part of the instruction set in the program memory 206. The movement of data between these various components may be scheduled in accordance with a decoder that accesses the instructions sets from the program memory, which is not shown in further detail in FIG. 2 for purposes of brevity. The interconnection network, which supports the transfer of data amongst the various components of the vector processor architecture 200 as shown in FIG. 2, is generally implemented as a collection of data buses and may be shared among a set of different components, ports, etc. In this way, several execution units 204.1-204.N may write to a single vector register 202, and the data loaded into several vector registers 202.1-202.N may be read by and processed by several of the execution units 204.1-204.N.

The use of instruction sets in accordance with the vector processor architecture 200 is generally known, and therefore an additional description of this operation is not provided for purposes of brevity. Regardless of the particular implementation, vector processors can greatly improve performance on certain workloads but have various drawbacks. For instance, it is very common in many signal processing applications for a specific vector data sample to be used many times in the calculation of an expression. In one scenario, for the implementation of a finite impulse response (FIR) filter, each vector data sample is multiplied by every coefficient of the filter. Thus, if a filter has 127 coefficients, then each vector data sample will be used as the input to 127 multiply-accumulate operations. This property is referred to as "data reuse." In conventional vector processors, such as the vector processor architecture 200 as shown in FIG. 2, data reuse is achieved by storing the data in the vector registers 202.1-202.N, which has several drawbacks.

Figure 3:
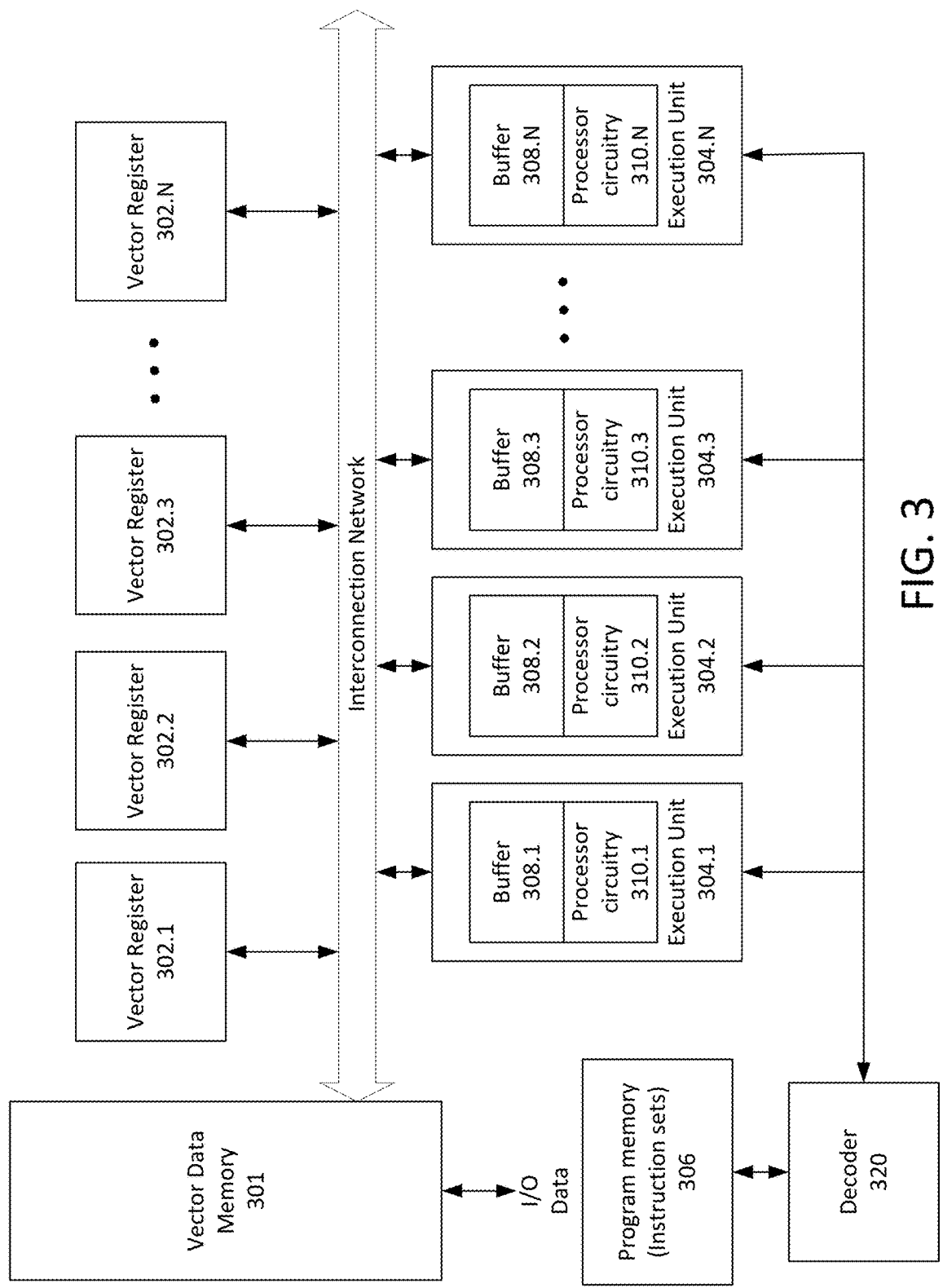
FIG. 3 illustrates a vector processor architecture, in accordance with the disclosure.

One drawback of this scheme is that, to enable practical compiler design, the vector registers 202.1-202.N must be implemented with aligned access. This is illustrated in FIG. 7B with respect to a scenario in which the vector registers 202.1-202.N store 4-entry 8-word register files in an aligned manner, which are then read from the vector registers 202.1-202.N in an aligned manner to provide as 8-element (such as 8 vector data sample) result. In this scenario as shown in FIG. 7B, the resister file stored in the vector registers 202.1-202.N is implemented as a 2D array of words. For such an approach, the vector data must reside entirely within the same entry of each element in the vector register file. However, it is common in many algorithms for the data to span across 2 or more entries of a register file as shown in FIG. 7B and referred to as unaligned access. Conventional vector processors, such as the vector processor architecture 200 as shown in FIG. 2, perform unaligned access by reading two vectors of data from the register files although there is only one vector of useful data, which is inefficient in terms of both cost and power. Another drawback is that convention processor architectures do not exploit the properties of streaming data applications, which is discussed in further detail herein with respect to the vector processor architecture 300 as shown in FIG. 3.

Moreover, signal processing for wireless systems, particularly newer standards such as the 3rd Generation Partnership Project (3GPP) Release 16 5G Phase 2 specification, the most recent at the time of this writing, require a high throughput at low power levels beyond what is possible in a conventional programmable vector/VLIW DSP architectures such as those illustrated in FIGS. 1 and 2.

The disclosure as further described herein addresses these issues by implementing a local buffer as part of each execution unit in conjunction with an instruction set that combines or fuses multiple vector processor instructions into a single vector processor instruction. This reduces the computational energy required to process vector data samples, which may be in accordance with wireless communication data processing. The disclosure as further described herein fuses multiple vector processor operations in a manner that maintains flexibility across various different wireless algorithm (or other suitable algorithm) workloads. A datapath is described that enables efficient fused instructions while maintaining such flexibility.

Vector Processor Architecture

FIG. 3 illustrates a vector processor architecture in accordance with the disclosure. The vector processor architecture as shown in FIG. 3 may be configured in accordance with any suitable type of vector processor application and implementation, which may utilize any suitable type of processor, CPU, etc. This may include standard, reduced instruction set computer (RISC), such as super scalar, very long instruction word (VLIW), graphics processing units (GPUs), etc. As noted above with reference to the vector processor architecture 200 as shown in FIG. 2, the vector processor architecture 300 as shown in FIG. 3 may also include any suitable number N of vector registers 302.1-302.N and execution units 304.1-304.N. The load-store machine architecture facilitates the vector processor architecture 300 moving data between the vector data memory 301, the vector registers 302.1-302.N, and the execution units 304.1-304.N. The vector registers 302.1-302.N may alternatively be referred to as vector register files, and may represent any suitable type of storage such as volatile or non-volatile memory, and which may have any suitable size, addressable space, and address configuration depending upon the size of the data samples that are loaded into the vector registers 302.1-302.N, which may be stored as data vectors in one or more vector register files, which is typically a function of the particular instruction set and/or protocol such as vector size, word size, etc.

Again, the vector processor architecture 300 may be implemented as part of or work in conjunction with a specialized component such as a digital signal processor (DSP) and/or a radio transceiver that implements digital signal processing to perform various operations that may be utilized as part of wireless signal processing applications associated with wireless data communications. Thus, and with respect to the vector processing operations, these operations may be any suitable type of function that operates on the vector data samples stored in each execution unit 304's respective local buffer 308.1-308.N, which is retrieved by each respective execution unit 304 from one or more of the vector registers 302.1-302.N in accordance with a received fused vector processor instruction. Again, such vector processing operations may include digital signal processing operations that are associated with wireless data communications.

The functions may be implemented as part of the particular application in which the vector processing architecture 300 is utilized, which may be digital signal processing operations for wireless communications. These may include the application and/or calculation of finite impulse response (FIR) filter contributions to a digital data stream, equalizer functions, the calculation of digital pre-distortion (DPD) coefficients or terms, the application or calculation of Fast Fourier Transforms (FFTs) and/or digital Fourier Transforms (DFTs), matrix operations, mixer and/or frequency correction calculations, peak detection and/or cancellation calculations, signal measurements, average signal measurement calculations over time, digital signal processing of signals transmitted or received via individual antenna data streams for multiple-input-multiple-output (MIMO) antenna systems, etc. Furthermore, the vector data samples as discussed herein may be part of an in-phase (I) quadrature-phase (Q) data stream, which may be processed prior to data transmission of wireless signals or after receiving the wireless signals. Additionally or alternatively, such functions may be implemented as part of graphics processing unit (GPU) to perform graphics processing and/or rendering.

The vector processor architecture 300 may also include any suitable number of execution units 304.1-304.N, which may implement any suitable type of vector processors, vector processing circuitry, etc., illustrated in FIG. 3 as the processor circuitry 310.1-310.N, and which may be implemented to perform specific types of vector data processing operations based upon respectively received commands or instructions. These commands or instructions may originate from a decoder or other suitable processor that functions to arbitrate or otherwise schedule the processing of I/O data that is stored in the vector data memory 301 and transferred from the vector data memory to the vector registers 302.1-302.N using the interconnection network. The execution units 304.1-304.N may alternatively be referred to herein as vector units, vector processing units, or functional units, or further alternatively as execution unit circuitry, vector unit circuitry, vector processing unit circuitry, functional unit circuitry, or simply as one or more processors. The execution units 304.1-304.N may be implemented in accordance with any suitable type of vector processor architecture and include any suitable number and/or type of vector processing circuitry, as shown in FIG. 3 as the processor circuitry 310.1-310.N, and which may include known vector processor architectures and/or types, to perform their respective vector processing operations.

Each of the execution units 304.1-304.N is configured to perform a specific type of mathematical operation via bit manipulation such as multiplication, addition, etc. Each of the execution units 304.1-304.N includes respective processor circuitry 310.1-310.N and is configured to execute, for each clock cycle, a set of specific types of vector processor instructions in accordance with a fused vector processor instruction. Thus, in contrast to performing a single vector processor instruction per clock cycle, the vector processor architecture 300 may receive a fused or concatenated vector processor instruction that includes any suitable number of vector processor instructions, as further discussed herein. The set of vector processor instructions that are fused into a single vector processor instruction, which is received by one or more of the execution units 304.1-304.N per clock cycle, may be encoded as various fields, each respecting a particular vector processor operation that is to be performed.

Thus, the execution units 304.1-304.N are configured to independently execute any suitable number of vector processor instructions each clock cycle in parallel with one another, as defined by each respectively received fused vector processor instruction (which may contain any suitable number of encoded vector processing instructions for respective vector processing operations). Because these instructions may be different than one another, the use of multiple execution units 304.1-304.N means that the vector processor architecture 300 may execute N number of instructions in parallel each clock cycle. Thus, the vector processor architecture 300 as described herein may utilize a data format of vector processor instructions such that each vector processor instruction enables flexibility for the execution units 304.1-304.N to perform any suitable number and type of sequential vector processor operations in accordance with a wide range of algorithms and applications.

The vector processor architecture 300 may form part of or the entirety of a system on a chip (SoC), which may be part of a larger overall system in which the vector processor architecture 300 is implemented. That is, the vector processor architecture 300 may be instantiated as part of a broader SoC that may include several other processors, ports, I/O, etc. In such a scenario, the I/O data coupled to the vector data memory 301 as shown in FIG. 3 may represent a SoC bus, which functions to write data to the vector data memory 301 and read data from the vector data memory 301. The communication between the vector data memory 301 and another entity using the SoC bus may be via Direct Memory access (DMA) or other suitable means. Thus, and as noted above for the vector processor architecture 200, the interconnection network may be a shared resource, and reducing the data transferred over the interconnection network thus reduces computational latency and power usage requirements.

Therefore, in contrast to the vector processor architecture 200 as shown in FIG. 3, each of the execution units 304.1-304.N as shown in FIG. 3 includes a buffer 308.1-308.N, which may be implemented as any suitable type of memory having suitable size, addressable space, and address configuration. Each of the execution units 304.1-304.N also includes respective processor circuitry 310.1-310.N, which performs the aforementioned instructions and thus constitutes the portion of the execution units 304.1-304.N that interfaces with the streaming buffers 308.1-308.N, performs the requested vector processing operations each clock cycle, and then writes the result back to either a respective buffer 308.1-308.N (if more vector processing operations are to be performed locally by the execution unknit 304) or to the one or more of the vector registers 302.1-302.N (once the execution unit 304 has completed the necessary vector processing operations) as discussed in further detail below. The buffers 308.1-308.N may be implemented as memory of a size smaller than each of the vector registers 302.1-302.N, which may include a size just large enough to hold vector data samples until the vector data samples are fully processed. The connections between the buffers 308.1-308.N and each respective processor circuitry 310.1-310.N are not shown in detail in FIG. 3 for purposes of brevity. However, because each buffer 308.1-308.N is local with respect to each execution unit 304.1-304.N, the data bandwidth between each buffer 308.1-308.N and its respective processor circuitry 310.1-310.N may be increased beyond the data bandwidth that would be available using the interconnection network, which represents an arbitrated and complex combination of shared data lanes.

The vector processor architecture 300 as described herein may be implemented in accordance with any suitable type of application that utilizes vector processing operations in accordance with any suitable type of vector processor instructions, which may be encoded into a fused vector processor instruction. The fused vector processor instructions may be generated by any suitable controller, processor component, etc., such as the decoder 320 as shown in FIG. 3, and include any suitable number of fields to facilitate the execution of various vector processor operations. The fused vector processor instructions may include fields representing various types of commands, pointers to address locations in the buffers 308.1-308.N from which the processing circuitry 310.1-310.N is to read and write data, the particular type of mathematical function or vector processing operation that should be performed by a respective execution unit 304 to which the vector instruction is sent, etc. Additional detail regarding the specific format and content of the fused vector processor instructions is discussed further below. Each execution unit 304.1-304.N is configured to execute any suitable number of vector processing operations per each received fused vector processor instruction, which may be sent to the execution units 304.1-304.N by the decoder 320 each clock cycle in accordance with a common system clock.

It is noted that for streaming applications the data is processed in a sequential order. Thus, a natural memory structure for streaming data is a circular buffer. The buffers 308.1-308.N may thus be implemented as circular buffers and be configured such that data is written into the end of the circular buffer and read from the beginning of the circular buffer in terms of the buffer's addressable space. Another advantage of using such a circular buffer configuration includes the ability to utilize simplified modulo addressing to read data from and write data to the circular buffer. As it is not practical for compilers to support circular addressing for the vector registers 302.1-302.N, the use of the local buffers 308.1-308.N, which may locally implement such circular addressing, is particularly advantageous and overcomes this issue. Moreover, in many streaming applications such as FIR filters, mixers, and DPD actuators used in Digital Front-Ends (DFEs), the processing may be formulated as a single instruction that is repeatedly executed in a single execution unit 304.1-304.N. Again, transferring data to and from the vector registers 302.1-302.N over the shared interconnection network is expensive in terms of both cost and power due to the complex architecture of interconnection networks and their typical implementation to support "many-to-many" communication features in accordance with vector processor architecture and design.

It is also noted that the use of the buffers 308.1-308.N differs from the use of a cache memory in various ways. A cache memory facilitates random access of the data stored therein. This feature requires cache memory to implement complex hardware that allows a check to be performed regarding whether the cache currently contains data that needs to be retrieved. Such features also result in processor stalls while waiting for the cached data to be retrieved. The complex hardware used for cache operation enables prefetch and predictive operations to be executed, which adds to their cost thereby limiting their practical implementation. The vector processor architecture 300 described herein may leverage the use of the buffers 308.1-308.N by exploiting the sequential nature of vector processing operations for certain applications, such as filter processor computations, that utilize streaming data. As discussed herein, the use of the buffers 308.1-308.N as part of the vector processor architecture 300 exploits the sequential and predictive nature of the computations performed for certain applications to eliminate the need for costly and complex data caches.

Figure 4:
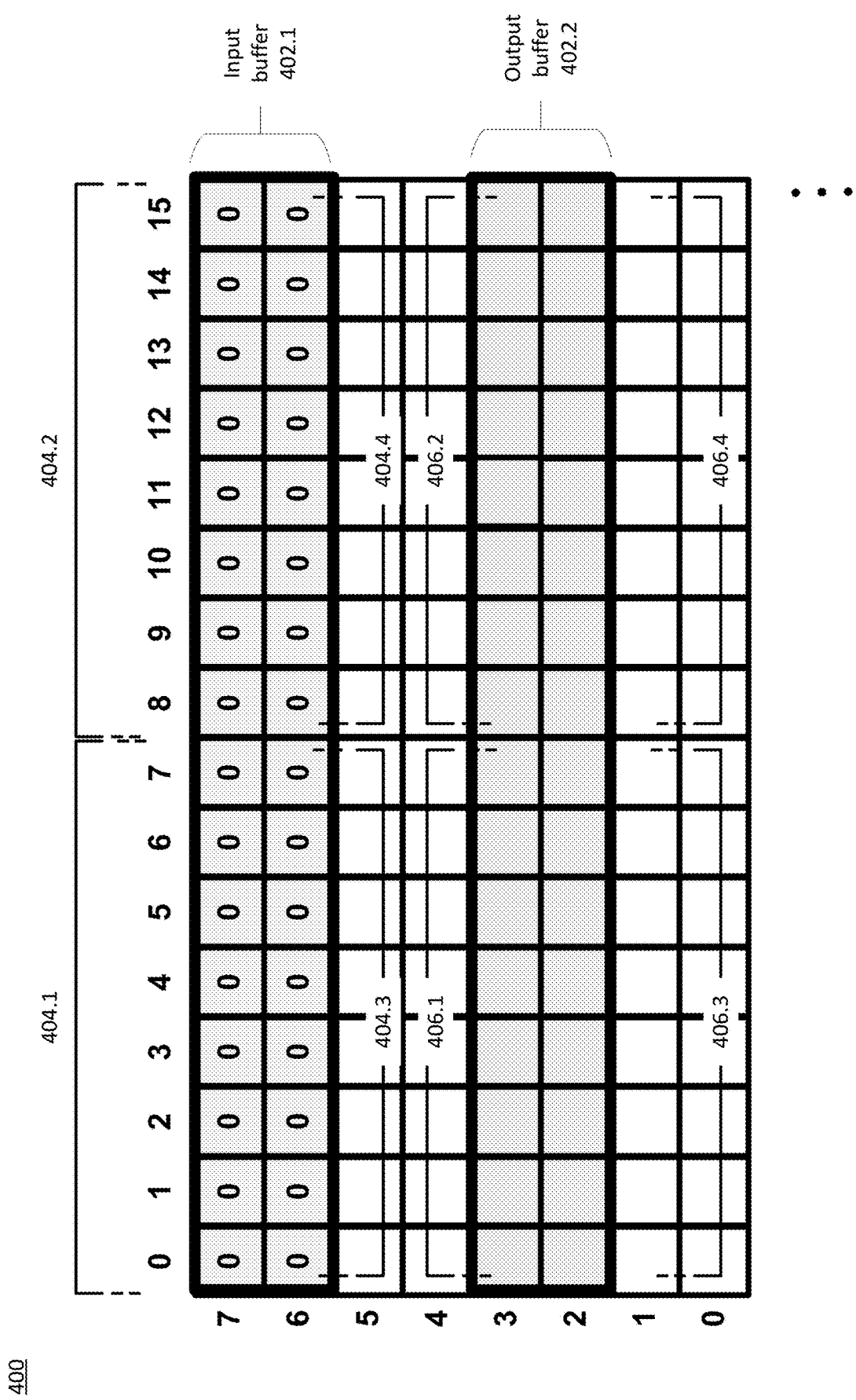
FIG. 4 illustrates additional details of a local buffer configuration, in accordance with the disclosure.

The buffers 308.1-308.N may each be further partitioned into any suitable number of additional buffers or "sub-buffers," which may be referred to herein as virtual buffers or buffer partitions, or simply as buffers with the understanding that the smaller buffer partitions may form part of a larger buffer component. Additional detail regarding the organization of the buffers 308.1-308.N is shown in FIG. 4, which illustrates a buffer 400. The buffer 400 as shown in FIG. 4 may be identified with any one of (or each of) the buffers 308.1-308.N as shown in FIG. 3, which is identified with a respective execution unit 304.1-304.N. In this scenario, the buffer 400 has a total addressable range of 8 rows 0-7 and 16 columns 0-15. Alternatively, the rows as discussed herein may be alternatively referred to as words, with one word or more words occupying each row. Each address location of the buffer 400 is represented as an individual box of an intersecting row and column, and may store an individual vector data sample. The buffer 400 is partitioned into two virtual buffers 402.1 402.2, each having a predetermined address range, and which may be circular in nature such that the starting address range of each buffer 402.1, 402.2 may be accessed and/or overwritten as the read and write pointers indicated by the vector processor instructions advance beyond the end of the address range, which advantageously maintains the size of the buffer 400 small and cost effective. The buffer 400 includes an input buffer 402.1, which has an address range identified with rows 6-7 and columns 0-15, and is thus configured to store a total of four data vectors 404.1, 404.2, 404.3, 404.4, with each of these data vectors containing 8 vector data samples. The buffer 400 also includes an output buffer 402.2, which has an address range identified with rows 2-3 and columns 0-15, and which has an address range configured to store a total of four data vectors 406.1, 406.2, 406.3, 406.4, with each of these data vectors also containing 8 vector data samples. Of course, and as discussed in further detail herein, the terms "input" and "output" in this context are with respect a current manner in which the buffers 402.1, 402.2 are being utilized, and each of the buffers 402.1, 402.2 may operate in a similar or identical manner but represent different ranges of addressable space within the buffer 400.

The data samples represented by one or more data vectors stored in the input buffer 402.1 and the output buffer 402.2 may be referred to herein as a set of vector data samples. The input buffer 402.1 and the output buffer 402.2 may have any suitable size and accompanying address range, and thus may be configured to store any suitable number and any suitable size of vector data samples and/or otherwise store any suitable number of sets of vector data samples. As shown in FIG. 4, the input buffer 402.1 is assumed to be initialized with zeros. Thus, each buffer or virtual buffer, as the case may be, which is identified with each respective buffer 308.1-308.N, may have any suitable type of address organization and be identified with a range of addresses representing the overall capacity of that particular buffer or virtual buffer.

Regardless of the particular address organization that is utilized, the buffers or virtual buffers may store sets of vector data samples over any suitable range of address locations. The use of the addressable space in the buffer 400 may be facilitated via the use of the aforementioned read pointers that are contained or otherwise encoded as part of each received fused vector processor instruction. The fused vector processor instructions may also include or otherwise encode write pointers, which specify the location within the buffer 400 (such as in the output buffer 402.2) to store the results of the vector processing operations performed on the vector data samples stored in the input buffer 402.1. Thus, and with reference to FIG. 4, the read pointers may point to a starting address in the input buffer 402.1 from which the vector data samples are to be retrieved for a particular vector processing operation, whereas the write pointers point to a starting address in the output buffer 402.2 to which the results of a particular vector processing operation performed on the vector data samples is then stored.

The address range that is incremented or offset between subsequent vector processing operations may advantageously be (but not necessarily be) a fixed or static offset value for both the read pointer and the write pointer. This value may be identified at compile time when the vector processor instructions and corresponding fields to be included in each fused vector processor instruction are initially generated. The use of a static increment or offset may be particularly useful, as the calculation of the next starting address identified by each subsequent read pointer and write pointer may be determined with a priori knowledge of the address range of each buffer and the data rate without performing additional complex processing tasks. The operation of the vector processing architecture 300 in accordance with a fixed I/O data rate may be leveraged to use of a static address increment between subsequent vector processing operations. In other words, because the buffers 308.1-308.N may retrieve vector data samples from the vector registers 302.1-302.N in accordance with a fixed or static data rate, this may be exploited to simplify the computation of the read and write pointer address offset calculations between subsequent vector processing operations, as the number of vector data samples to be processed each clock cycle may be fixed and thus a predetermined value that is related to the fixed data rate in terms of clock cycles.

Moreover, each buffer or virtual buffer may be identified with a distinct vector data stream, with the vector processing operations being sequentially applied to vector data samples for each distinct data stream to calculate results in accordance with the type of vector processing operations that are performed. The vector processing operations may be sequentially executed over several respective clock cycles, with new vector data samples being retrieved from the vector registers 302.1-302.N and, once no longer needed for further vector processing operations, the previous vector data samples stored in the buffer or virtual buffer may be overwritten with the new (i.e. more recently retrieved) vector data samples. In this way, the buffer or virtual buffers as described herein function in a circular manner by advancing, within each buffer, the next range of addresses used to store new vector data samples, and then returning to the original starting address over time as subsequent vector processing operations are performed and completed on older vector data samples.

Again, the buffers 308.1-308.N may store sets of vector data samples over any suitable range of address locations, which may be retrieved from one or more of the vector registers 302.1-302.N. This is enabled via the use of the aforementioned read pointers that are contained or otherwise encoded as part of each received fused vector processor instruction, with a single fused vector processor instruction encoding information for the read pointer increment to be performed after each one of the vector processing operations. The fused vector processor instruction may also include or otherwise encode write pointers, which specify the location within the buffer to store the results of the vector processing operations performed on the vector data samples. A single fused vector processor instruction may thus also encode information for the write pointer increment to be performed after each vector processing operation has been completed and data is to be written to the buffer, each vector processing operation being executed in response to receiving the same fused vector processor instruction.

The vector processing operations may be sequentially executed over several respective clock cycles, although each of the vector processing operations may require a single fused vector processor instruction versus a sequential set of separate vector processor instructions. Further details of the nature of the fused vector processor instruction and how several vector processor instructions may be encoded into the fields of a single fused vector processor instruction are discussed below with respect to the illustrative implementations. Various implementations for vector processing operations performed by the execution units 304.1-304.N of the vector processor architecture 300 in accordance with a data path are provided in further detail below, although these are non-limiting scenarios as the vector processing architecture 300 may be implemented in accordance with any suitable type of application and implementation, as noted above.

Figure 5:
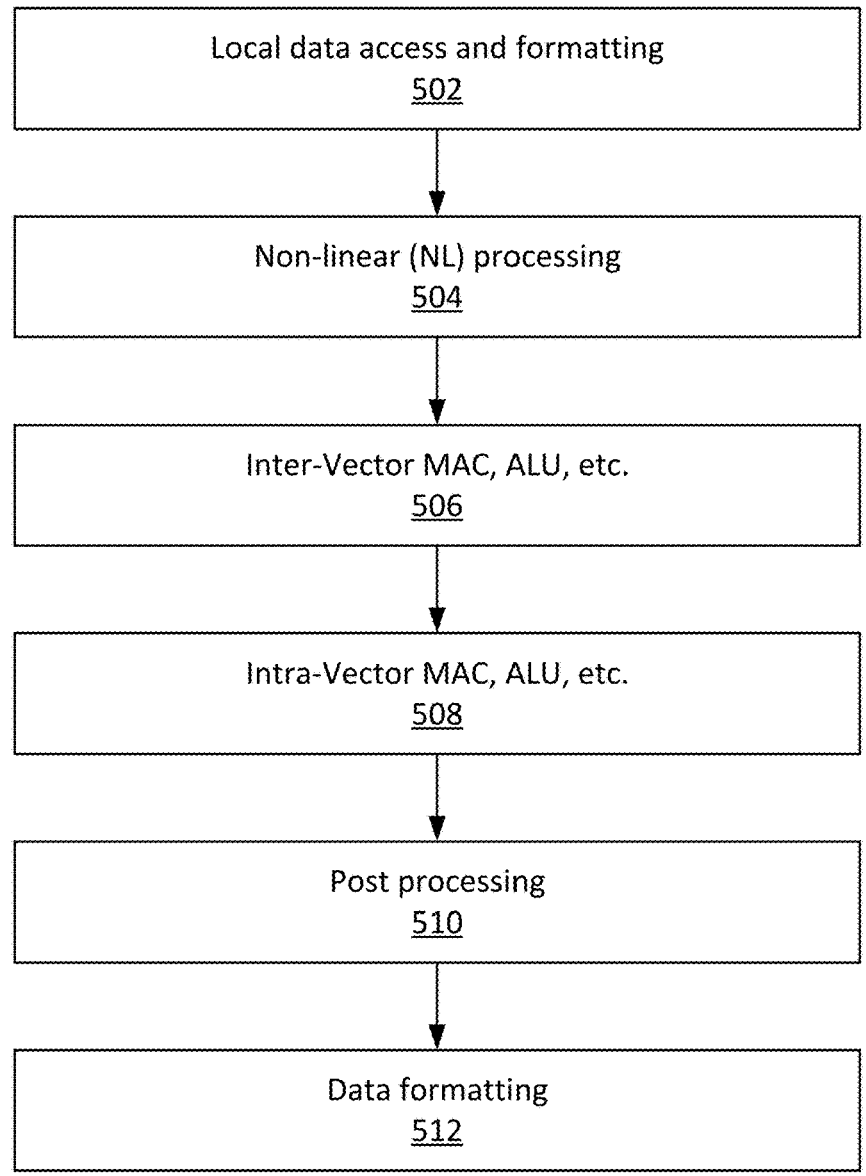
FIG. 5 illustrates a vector processing loop iteration implementing multiple separate vector processing instructions, in accordance with the disclosure.

Vector Processing Loop Iteration—Multiple Separate Vector Processing Instructions FIG. 5 illustrates a vector processing loop iteration implementing multiple separate vector processing instructions, in accordance with the disclosure. The conventional vector processing architecture 200 may execute one vector processing operation per each received vector processor instruction. In other words, several vector processing operations may be performed over a series of clock cycles, with each vector processor instruction defining the details regarding how each individual vector processing operation is to be performed. This may include the starting address of the vector data samples to be retrieved from the vector registers 302.1-302.N, the type of vector processing operation to perform on the vector data samples, and a starting address of where to write the results back into the one or more of the vector registers 302.1-302.N.

The conventional vector processor architecture 200 as shown in FIG. 2 may implement a number of vector processing iterations or loops, with one such iteration shown in FIG. 5 which represents a conventional datapath used to execute vector processing operations on vector data samples retrieved form the vector registers 302.1-302.N. The sequence of vector processing operations constituting one loop iteration as shown in FIG. 5 may be repeated a number of times for additional sets of vector data samples as additional vector data samples are retrieved from the vector registers 302.1-302.N, which requires use of the interconnection network each time vector data samples are transferred between the vector registers 302.1-302.N and the execution units 204.1-204.N. Moreover, because the number of vector processing operations is limited to one per vector processor instruction, each vector operation in the sequence that is executed by an execution unit 204.1-204.N may require one or more vector processing operations, each requiring a separate vector processor instruction.

For instance, and with reference to FIG. 5, the local data access and formatting vector processing operation(s) 502 includes rearranging the vector data samples retrieved from the vector registers 302.1-302.N, copying the vector data samples, and aligning the vector data samples with the vector datapath utilized by the particular execution unit 204.1-204.N. The non-linear (NL) processing vector processing operation(s) may include the computation of a non-linear function f(x) on an input x of the vector data samples. The vector processing operation(s) such as the inter-vector multiply-accumulate (MAC), arithmetic logic unit (ALU) operations, etc. may include a computation on each element or vector data sample of a data vector. The intra-vector MAC, ALU, etc. vector processing operation(s) may include a summation of all vector elements to find a vector data minimum or maximum. Post processing vector processing operation(s) may include normalization, type conversion, rounding, saturation, etc. Finally, data processing vector processing operation(s) may include combining vectors, packing vectors with partial results, etc. Each of these stages includes one or more vector operation, each requiring a separate vector processor instruction that may be received each clock cycle. Thus, the vector processing loop iteration as shown in FIG. 5 requires a significant number of vector processor instructions to be received to complete a single iteration of vector processing operations, which may span a number of clock cycles.

Fused Vector Processing Instruction Pipeline

It is noted that each of the vector processing operations as shown in FIG. 5 needs to be executed in accordance with several stages or phases. In other words, and with continued reference to the conventional vector processor architecture 200 as shown in FIG. 2, each of the vector processing operations 502, 504, 506, 508, 510, and 512 includes reading the vector data from the vector registers 202.1-202.N, transferring the vector data across the interconnection network, feeding the data to the execution units 204.1-204.N, performing vector processing operations in each of the execution units 202.1-202.N, moving the results of the computations performed in the execution nits 202.1-202.N back across the interconnection network, and then writing these results back into the vector registers 202.1-202.N. These phases are repeated for each of the processing operations 502, 504, 506, 508, 510, and 512, with each phase requiring one or more clock cycles depending upon the particular architecture of the vector processor, the size of the data being accessed and computed, etc. In other words, each of the vector processing operations 502, 504, 506, 508, 510, and 512 as shown in FIG. 5 inherently includes several vector processing operations that require several vector processor instructions that occur over one or more clock cycles. Thus, each of the vector processing operations 502, 504, 506, 508, 510, and 512 as shown in FIG. 5 repeatedly utilize the interconnection network to exchange data between the vector registers 202.1-202.N and the execution units 204.1-204.N.

The repetitive nature of each of the processing operations 502, 504, 506, 508, 510, and 512 using the interconnection network to transfer data in this manner expends a great deal of power and introduces latency into the system. In contrast, the use of a fused vector processor instruction that exploits the local buffers 308.1-308.N, as discussed herein and in further detail below, advantageously reduces both system latency and power consumption. In particular, and as further noted below, once the vector data samples are retrieved from the vector registers 302.1-302.N and loaded into the local buffers 308.1-308.N, the vector data samples may be loaded directly into the vector datapath without the additional use of the interconnection network between vector processing operations. Thus, each of the vector processing operational stages as described in further below with respect to FIG. 6 (i.e. 602, 604, 606, 608, 610, 612) may be executed such that only a single clock cycle is needed for each of the vector processing operations. However, the use of fused vector processing operations as discussed herein and with respect to FIG. 6 in further detail below addresses these issues by providing a set of chained individual vector processing instructions that may be executed sequentially within an execution unit 304.1-304.N. As a result, both the latency and power consumption of the vector processor architecture 300 may represent an improvement of several times better than the conventional vector processor architecture 200.

Moreover, the increased latency introduced into the vector processor architecture 200 as noted above further increases code complexity and size. That is, the system latency needs to be compensated for to ensure that the execution units 204.1-204.N execute vector processing operations in parallel with one another to maintain the desired speed and efficiency of the system. The use of the fused vector processor instructions as noted herein further provide advantages with respect to reduced code size and complexity as a byproduct of reducing such latency.

Figure 6:
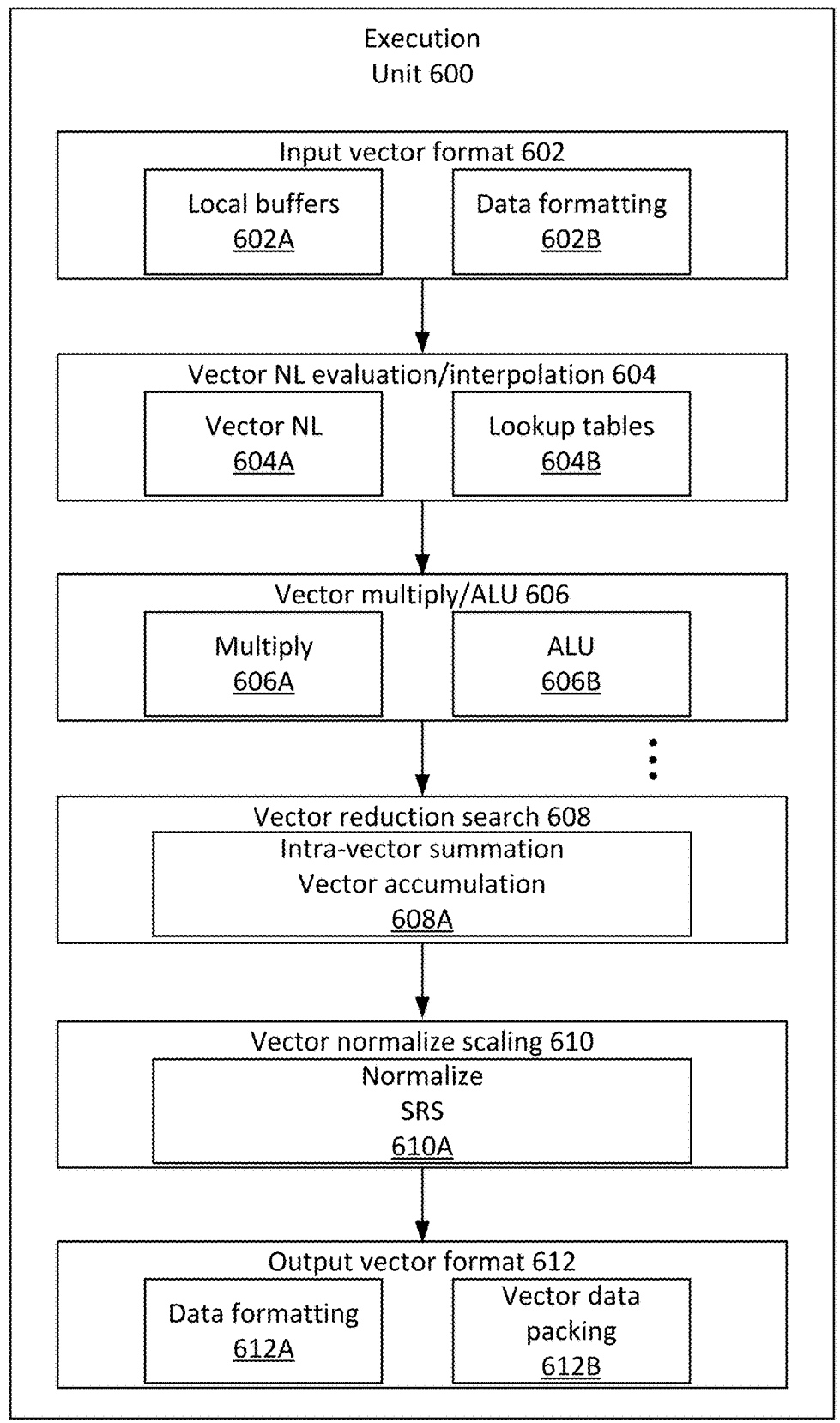
FIG. 6 illustrates a vector processing loop iteration implementing a fused vector processing instruction, in accordance with the disclosure.

The vector processing operation pipeline as shown in FIG. 6 illustrates a sequential series of vector processing operations that may be executed by one or more of the execution units 304.1-304.N as discussed herein with reference to FIG. 3. Thus, the execution unit 600 as shown in FIG. 6 may be identified with one or more (or all) of the execution units 304.1-304.N as shown in FIG. 3. In contrast to the vector processing operation pipeline as shown in FIG. 5, which is implemented via the execution unit 204.1-204.N of the vector processor architecture 200, the vector processing operation pipeline as shown in FIG. 6 may be implemented by an execution unit 304.1-304.N of the vector processor architecture 300 as shown and discussed herein with reference to FIG. 3. The vector processing operation pipeline as shown in FIG. 6 may, in contrast to the vector processing operation pipeline as shown in FIG. 5, perform several vector processing operations in response to receiving a single fused vector processor instruction. Thus, the various blocks as shown and described with respect to FIG. 6 may represent the buffers 308.1-308.N and the vector processing operations performed by the processor circuitry 310.1-310.N via the execution units 304.1-304.N, as further discussed below.

To do so, the vector processor architecture 300 may utilize fused or concatenated vector processing instructions, which may be a single vector processor instruction having a number of fields that represent or otherwise encode individual vector processing instructions. In other words, for a single fused vector processor instruction, an execution unit 310.1-310.N may (via the vector processor circuitry 304.1-304.N) perform the plurality of vector processing operations in accordance with each of the individual vector processor instructions indicated by the fields contained within the fused vector processor instruction. Thus, the fused vector processor instruction may include any suitable type of machine-readable code, opcode, etc. that may be read by the execution units 304.1-304.N and/or the processor circuitry 310.1-310.N implemented by each of the execution units 304.1-304.N, as discussed herein.

The fused vector processing instruction, via the fields representing encoded individual vector processor instructions, may thus identify a number of individual vector processing instructions, which in turn indicate a number of computations to perform, a number and location (such as a read pointer address location) from which to retrieve vector data samples from the vector data registers 302.1-302.N, a number of vector data samples to retrieve from the vector registers 302.1-302.N, a location from which the vector data samples are stored or written to the buffers 308.1-308.N (such as write pointer address starting locations), a location (such as a read pointer starting address location) of an address of the buffers 308.1-308.N to read the vector data samples, a number and/or type of vector processing operations to perform on vector data samples read from the buffers 308.1-308.N, a location (such as a write pointer starting address location) in the buffers 308.1-308.N to write the results of performing the vector processing operations, etc.

Therefore, a single fused vector processing instruction may be received via an execution unit 304.1-304.N during a single clock cycle, but may contain encoded data fields indicating a sequence of vector processing operations to be performed over several subsequent clock cycles. That is, an execution unit 304.1-304.N may execute, in response to receiving a fused vector processor instruction having a plurality of fields, a plurality of vector processing operations on a set of vector data samples that may be read from the vector registers 302.1-302.N, written into a respective buffer 308.1-308.N, and then initially read from the respective buffer 308.1-308.N. Of course, the fused vector processor instruction may alternatively indicate that the vector processing operations be executed on vector data samples stored in a buffer 308.1-308.N without the need to load the vector data samples from the vector registers 302.1-302.N.

In any event, the use of the fused vector processor instruction is enabled via the use of the local buffers 308.1-308.N, which allow for each execution unit 304.1-304.N to read vector data samples from the buffers 308.1-308.N to initiate the vector processing operations and write the results of each vector processing operation to the local buffer 308.1-308.N. These results may then be read from the local buffer 308.1-308.N via the respective execution units 304.1-304.N to execute the next vector processing operation, and so on. Thus, the circular nature of the buffers 308.1-308.N is particularly advantageous in this context, as the contents of the buffers 308.1-308.N may be rewritten over several vector processing operations without the need to retrieve vector data samples from, or load vector data samples into, the vector registers 302.1-302.N.

With continued reference to the vector processing operation pipeline as shown in FIG. 6, the local buffers 602A may be identified with one or more different partitions of the buffers 308.1-308.N for one or more (or all) of the execution units 304.1-304.N. The other blocks as shown in FIG. 6 may represent hardware, software, or any suitable combination thereof, each being configured to execute one or more specific types of functions in accordance with a particular vector processing operation. The various blocks as shown in FIG. 6 may be implemented as dedicated hardware configured to execute certain types of vector processing operations in accordance with the vector processor architecture 300 as shown in FIG. 3, which may include dedicated hardware configurations of known types to perform specific types of mathematical functions or other suitable vector processing operations. This may be one or more predetermined functions that the execution unit 600 is configured to execute upon receiving a fused vector processor instruction. The illustrated vector processing pipeline as shown in FIG. 6 is provided for ease of explanation and not limitation, and may include any suitable number and/or type of blocks depending upon the particular application and the required number and/or type of vector processing operations that need to be executed for that application.

Thus, the data formatting block 602B may represent the functionality associated with a respective execution unit rearranges the vector data samples with respect to the data lanes utilized by the execution unit 600, which may correspond to how the vector data samples are initially stored in the local buffers 602A and/or how the vector data samples are rearranged once stored in the local buffers 602A. This may vector data formatting, the generation of sliding windows for filters, DPD, etc. This may also include the replication of portions of vector data samples (i.e. cloning or broadcasting). Another scenario is alignment of the vector data samples with the datapath used by the vector processor architecture 300 (multipliers, ALUs, bit manipulation units, etc.). Once the data is formatted to be aligned with the datapath of the execution unit 600, a number of vector processing operations are executed on the vector data samples in the blocks 604, 606, 608, and 610, each of which may be repeated for each vector data sample across each "lane" of the datapath a number of times depending upon size the data vectors being processed.

Once the vector processing operations in blocks 604 and 606 have been completed (and additional vector processing operations if needed), then the vector data samples may need to be further rearranged with respect to bit order, merging previous results, combining various processing results with previous results, concatenating results, interleaving results, etc., which may be referred to as post-SIMD operations (assuming a SIMD vector processor architecture is used for the vector processor architecture 300). Given the frequency of the data formatting as part of vector processing operations, the execution unit 600 as shown in FIG. 6 may include dedicated hardware, software, or combinations of both that is represented as the blocks 602B, 612A, which may perform such vector processing operations.

With respect to the vector processing operations as shown in the blocks 604, 606, and further blocks and vector processing operations as applicable as illustrated in FIG. 6, these blocks function as part of the SIMD datapath (again assuming a SIMD vector processor architecture is used for the vector processor architecture 300). In this context, one or more of the blocks as shown in or represented by the blocks 604, 606, 608, 610, etc. may represent dedicated hardware, software, or combinations of both configured to execute specific types of vector processing operations in a single clock cycle. This may include the calculation of vector non-linear (NL) function evaluation, which may be performed on vector data samples via the block 604A, such as exponential functions $e^{j\theta}$, square root functions $\sqrt{x}$, inverse functions $$\frac{1}{x},$$

inverse square root functions $$\frac{1}{\sqrt{x}},$$

etc. Although the block 604A may function to compute any suitable type of function in accordance with a particular vector processing operation, the block 604A may represent commonly-used functions for a particular application. The block 604B may represent a quantized non-linear function stored in memory, which may be used to perform a linear interpolation between two vector data sample points and be used in conjunction with the block 604A to evaluate more complex non-linear functions or when the vector NL block 604A does not include dedicated hardware for a particular NL function to be evaluated.

The next blocks 606A and 606B may be implemented to perform additional vector multiplication on the results of the previous block 604. This may include a linear interpolation for the lookup tables, a vector multiplication on real and complex data, vector arithmetic, vector comparisons, Boolean operations, etc. The blocks 606A, 606B may be implemented as dedicated hardware, software, or combinations of both to facilitate such functions independently or in combination with one another based upon the particular vector processing operation that is received. The blocks 606A, 606B are shown as a non-limiting scenario, and the execution unit 600 may include any suitable number of such blocks, which may be repeated several times depending upon the particular type of vector processing operation that is being performed.

Regardless of the number and type of vector processing operations performed in the blocks 604, 606, the vector processing operations result in a calculated result of vector data samples constituting a data vector. However, additional calculations within the data vector may be desired, and thus the vector reduction search block 608 functions to perform intra-vector summation and vector accumulation in block 608A. This may include the identification of the maximum and/or minimum vector data sample within a data vector, the summation of all data vector samples within a data vector, calculate a final accumulation of multiplier/ALU results, etc. This may be referred to as reduction and may be performed via the block 608A, which may also represent dedicated hardware to perform this functionality.

Next, the execution unit 600 may perform vector normalization and/or scaling via the block 610A, which again may be performed via dedicated hardware, software, or combinations of both. This may include shifting, rounding, and/or saturation of vector computations output by the previous block 608A. This may include normalization vector processing operations to support pseudo floating point, removing leading zeroes, and/or fitting a calculated result output by the block 608A to a particular data vector size. The data vector samples output by the block 610A may then be further processed by the data block 612A to provide the appropriate vector data formatting, and the block 612B which facilitates vector data packing operations. The vector data packing operations may enable the calculated results of any suitable number of previous vector processing operations to be written to a data vector that may, once fully assembled or packed over a number of vector processing instructions, be transmitted by the execution unit 600 to one or more of the vector registers 304.1-302.N. Again, although the vector data packing performed by the block 612B may be executed in response to the completion of several vector processing operations, the received fused vector processor instruction may include encoded data fields that enable each of these vector processing operations to be performed.

Again, conventionally the vector processing operations performed by each block of the execution unit 600 is executed separately per each received vector processor instruction, with one vector processing operation being performed for each received vector data processor instruction. The vector processor architecture 300 as described herein leverages the use of the buffers 308.1-308.N in conjunction with a fused vector processor instruction having multiple fields to perform any suitable number of vector processor instructions for each fused vector processor instruction that is received. That is, and with reference to Table 1 below, a number of vector processing operations may be performed as part of the vector processing operations executed via the SIMD datapath of the execution unit 600 as shown in FIG. 6, which may include the blocks 604 and 606, although the vector processing operations may extend to any of the processing stages or blocks as shown in FIG. 6. As shown in Table 1 below, a conventional vector processor architecture requires a number of vector processor instructions as each operation is a mathematical calculation that requires a number of sequentially executed vector processing operation to be performed, which conventionally requires one instruction per vector processing operation. The use of the fused vector processing instruction enables such calculations to be performed using one fused vector processor instruction.

TABLE 1

| Operation | Fused datapath instructions | Conventional datapath instructions |
|---|---|---|
| ab + cd | 1 | 2 |
| abc | 1 | 2 |
| $a\dfrac{b}{\sqrt{c}}$ | 1 | 4 |
| (a + b)c − d | 1 | 2 |
| af(b) | 1 | 3 |
| $\dfrac{f(b)}{a}$ | 1 | 5 |

Buffer Implementation to Facilitate Fused Vector Processor Instructions

Again, the buffers 308.1-310.N as shown in FIG. 3 may be implemented to facilitate performing vector processing operations locally on each execution unit 304.1-304.N without retrieving additional vector data samples from the vector registers 302.1-302.N. As shown in FIG. 4, the buffer 400, which may be identified with one of the buffers 308.1-308.N as shown in FIG. 3, may be partitioned or subdivided into several buffers of different addressable ranges. This may advantageously be leveraged to implement the fused vector processor operation as discussed herein. This may be particularly advantageous when each buffer partition is dedicated for a specific type of vector processing operation that may be executed as part of a pipeline of cascaded processing operations, as discussed herein with reference to FIG. 6.

Thus, and as shown in FIG. 4, the buffer 400 may be partitioned into any suitable number of virtual buffers 402, with an input buffer 402.1 and an output buffer 402.2 being shown in FIG. 4. Each of the virtual buffers 402 may function as an input buffer, an output buffer, or both, depending upon the particular vector processor operation that is being performed and whether a virtual buffer 402 is bead read from or written to during that vector processing operation. With reference to FIG. 6, a set of vector data samples may be retrieved from the one or more vector registers 302.1-302.N and stored in the input buffer 402.1 as formatted vector data samples. Again, the buffers 308.1-308.N may be identified with the local buffers 602A as shown in FIG. 6. The vector data samples stored in the input buffer 402.1 may be read by the blocks 604A, 604B to perform any suitable type of vector processing operation, which may include the use of non-linear functions, lookup table and interpolation, etc. The results of the vector processing operations performed at block 604 may then be stored at any suitable location in the output buffer 402.2. For the next vector processing operations at the block 606, the output buffer 402.2 may then function as an input buffer such that the stored vector data sample results from the vector processing operation performed at block 604 are stored in the output buffer 402.1, and then read as a result of the vector processing operations performed at the block 606.

Although only two buffers 402.1, 402.2 are shown in FIG. 4, the buffer 400 may include any suitable number of buffers 402 spanning various ranges or addresses of the buffers 308.1-308.N. Thus, the buffer 400 may include additional buffers, with this process repeating for additional vector processing operations identified with the blocks 604, 608 and/or additional vector processing operations performed by the blocks 608, 610, 612, etc. Repeating the above scenario, the results of the vector processing operations being performed on the vector data samples read from the buffer 402.2 may then be stored in a further virtual buffer (not shown), which are accessed as a result of the vector processing operations performed at the block 608, and so on. The circular nature of the buffer 400 is particularly advantageous in this context, as this enables each virtual buffer's addressable space to be re-used or overwritten as additional vector processing operations are performed locally by the execution unit 600 without retrieving additional vector data samples from the one or more vector registers.

Figure 7A:
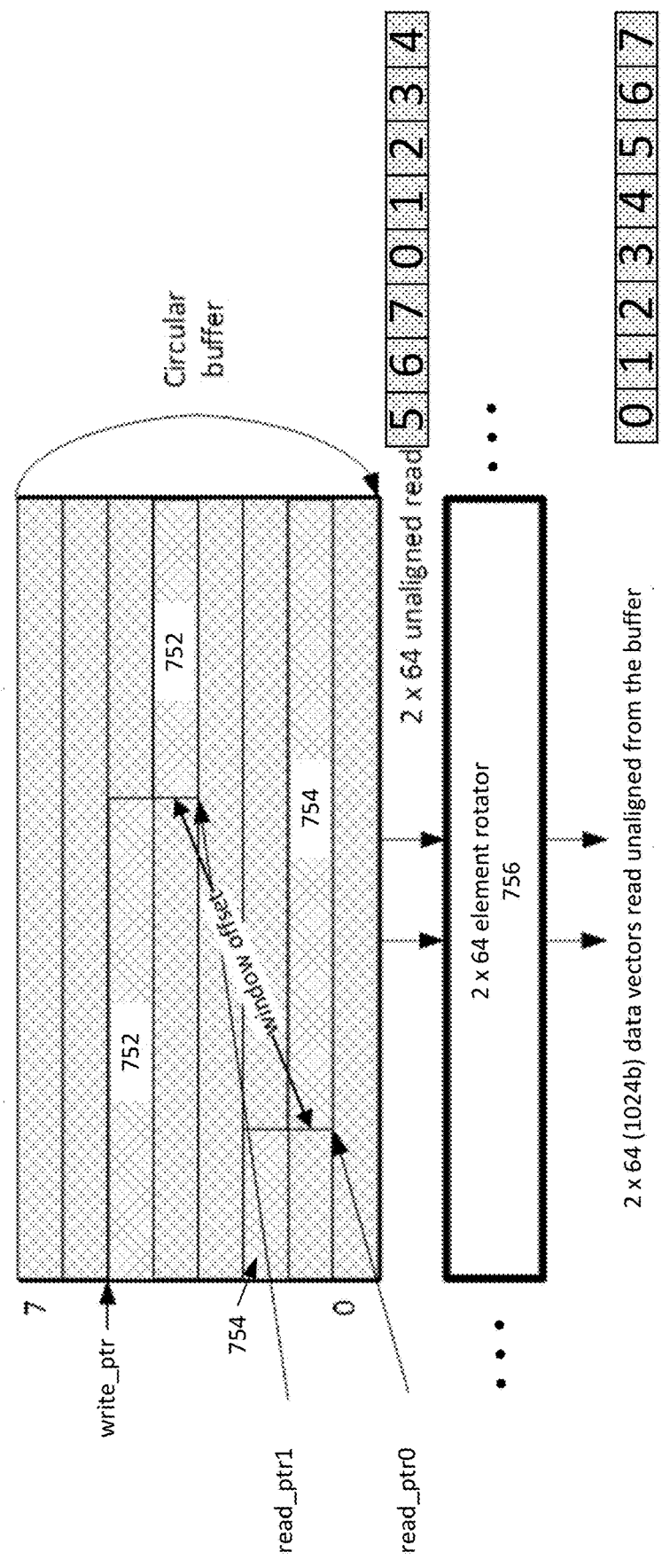
FIG. 7A illustrates a configuration of a local buffer showing a rotator to compensate for misalignment of read vector data samples, in accordance with the disclosure.
Figure 7B:
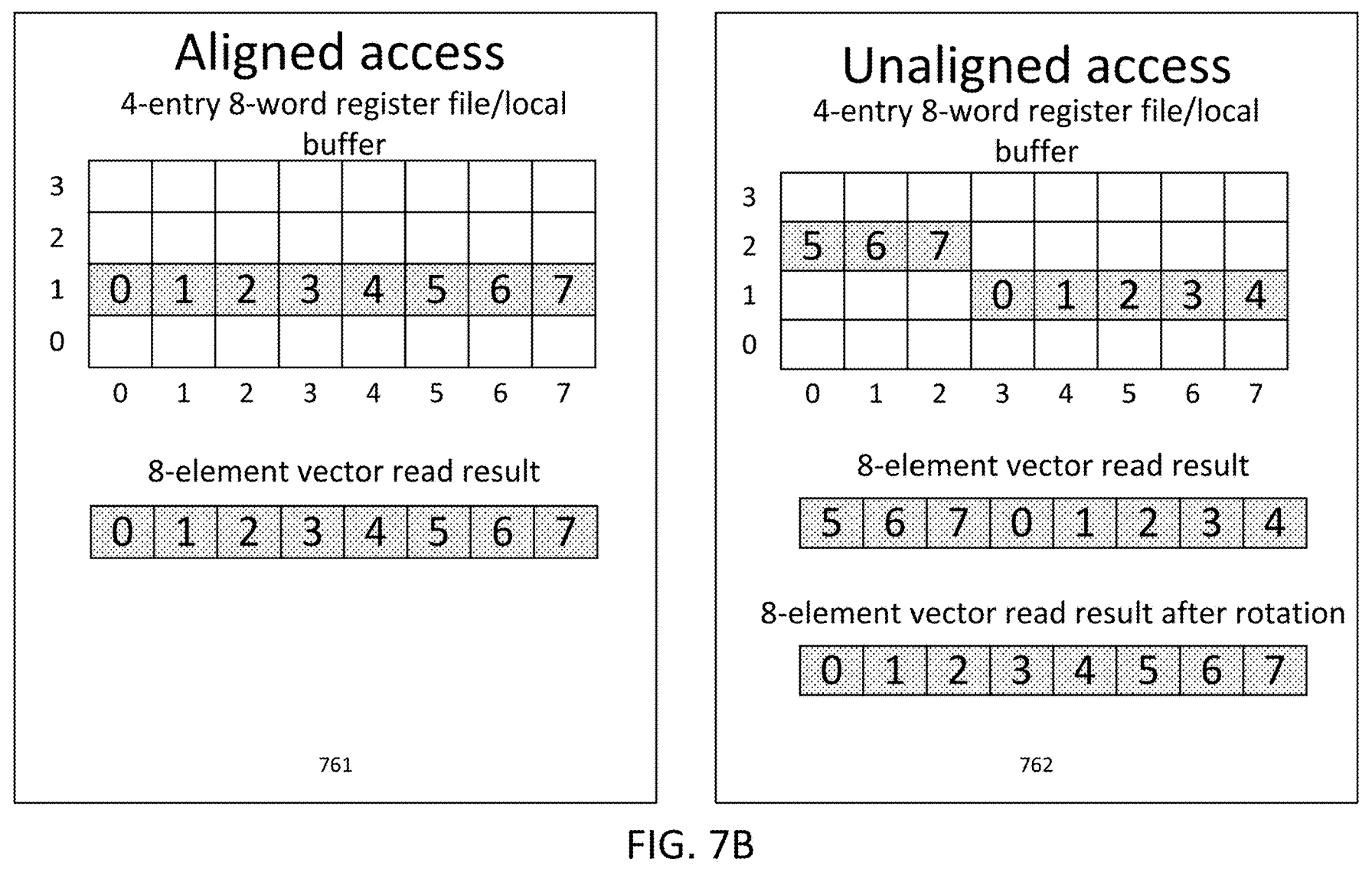

Moreover, the use of the buffers 308.1-308.N enables data access starting at any word and with no overhead. That is, once the vector processing operations have been completed, the results may be read from the buffers 308.1-308.N in an unaligned manner and loaded into the vector registers 302.1-302.N using store operations. This is illustrated in FIG. 7A via the use of the stored data vectors 752, 754 being stored in the buffer 700 across different address ranges. The stored data vectors 752, 754 may represent any suitable number of vector data samples, and may constitute one or more data vectors that are retrieved from the vector registers 302.1-302.N. The buffer 700 as shown in FIG. 7A may thus be identified with any one of the buffers 308.1-308.N as discussed herein with reference to FIG. 3.

To adapt to the unaligned manner in which the vector data samples are stored in the buffer 700, the vector processor architecture 300 may include one or more data rotators such as the data rotator logic 456 as shown in FIG. 7A. Thus, the buffers or virtual buffers may be referred to as "circular," meaning that vector data samples may be stored in a manner that "wraps" across the rows and/or columns of addressable space in an unaligned manner and may span the end of a particular addressable range (such as a range of addresses for a row) and the beginning of another addressable range (such as another row), as shown in FIG. 7A for the data vectors 752, 754.

Although a single data rotator logic 756 is shown in FIG. 7A, this is for purposes of brevity, and the vector processor architecture 300 may include any suitable number of data rotators depending upon the particular application and implementation. The data rotator logic 756 is illustrated as having a specific size, but may be implemented having any suitable size depending upon a particular application. The data rotator logic 756 may be implemented using any suitable hardware components, software components, or combinations thereof. The data rotator logic 756 may be implemented as a Benes network or other suitable component using hardware. The data rotator logic 756 is not shown in FIG. 3 for purposes of brevity, but functions to align the vector data samples that are written to the buffer 700 at the address indicated by a write pointer write_ptr as discussed herein, and read from the buffer 700 in an unaligned manner at starting address locations as indicated by the read pointers read_ptr0 and read_ptr1. The starting address location of the read pointers read_ptr0 and read_ptr1 may be part of a single fused vector processor instruction and constitute respective read pointers as discussed herein.

FIG. 7B illustrates a scenario in which 2 vectors 752, 754 may be accessed from the buffer 700. The two vectors 752, 754 may be used in two input vector operations such as a vector add or a vector multiply. Again, the starting position of each vector is indicated by read pointers to the starting address position in the buffer 450 as indicated by read_ptr0 and read_ptr1, respectively. Thus, given a vector length of N elements (such as vector data samples), two sets of N sequential elements may be fetched starting from the respective read pointer positions and wrapping to the next consecutive row of the memory as needed. If a starting position of the read pointers point to word zero, then the vector access is aligned to the vector datapath as shown in the aligned access scenario 761 in FIG. 7B. That is, element 0 of a vector is aligned with element 0 of a vector ALU or other suitable vector processor component in the vector datapath. However, if the position of the first element of a vector in the buffer 700 does not point to element 0, then the access is unaligned. This is illustrated in the unaligned scenario 762 in FIG. 7B, in which the first element of the vector is in position 3 of the buffer 700. In such a case, once the vector is read from the buffer 700, element 0 of the vector is in position 3 of the vector ALU, which would result in an incorrect computation. The vector thus needs to be rotated 3 positions as shown in the read result after rotation in the unaligned scenario in FIG. 7B.

Again, this alignment is achieved using the data rotator logic 756 as shown in FIG. 7A, which may include two or more data rotators. In this way, each of the 2 unaligned vectors 752, 754 may be independently rotated by each respective data rotator logic 756 such that each vector becomes aligned to the arithmetic vector datapath. A similar approach may be used to write the resultant vector back to the buffer at any alignment. The following implementations as discussed herein may utilize such data rotation as needed, although this step may not explicitly be noted further herein for purposes of brevity.

Thus, in contrast to the unaligned access from the 4-entry 8 word register file as shown in the unaligned access scenario 762 in FIG. 7B, which requires retrieving all vector data samples from rows 1 and 2, the circular nature of the local buffer 700 enables the execution units 304.1-304.N to read the vector data samples over an address range that includes these vector data samples and no additional vector data samples. This increases efficiency and power savings, as noted herein. The data rotation may be performed at any suitable time to ensure correct computations, and once aligned may then be stored in the vector registers 302.1-302.N. In this way, the data rotator logic 756 re-aligns the vector data samples to ensure compatibility with standardized compilers and instruction sets that access the vector data samples from the vector registers 302.1-302.N in an aligned manner. The data rotator logic 756 may use information regarding the window offset and size of the stored data vectors to shift or realign the bits that are read from the buffer 700 using the read pointer address encoded into the fused vector processor instruction, and this may occur in a manner that is transparent to the compiler, the decoder 320, or other component generating the vector processor instructions.

Fused Vector Processor Instruction Format

As noted herein, a fused vector processing instruction may include a number of fields that may represent encoded data, the encoded enabling the execution units 304.1-304.N of the vector processor architecture 300 to perform any suitable number of vector processing operations. With reference to the scenario described above for the execution unit 600 utilizing the virtual buffers associated with the buffer 400, this may include all information required to perform any suitable number of vector processing operations until the vector data samples are completely processed as provided by the block 612B. Thus, the fields may include an address location within the vector registers 304.1-304.N to initially retrieve the vector data samples for a particular set of vector processing operations. The fields may also include one or more read pointers indicating a starting address location within the buffer 400 from which the set of vector data samples are to be read to begin each respective one of the sequential vector processing operations. The fields may additionally include one or more write pointers indicating a starting address location in the buffer 400 where the results of each respective one of the sequential vector processing operations are to be stored in the buffer 400.

Moreover, the fields may include any suitable type of encoded data that functions to configured the blocks 602B, 604A, 604B, 606A, 606B, 608A, 610A, and/or 612A as discussed herein with reference to FIG. 6. This may include not only read and write pointers as noted above, but additionally the specific type of vector processing operations to be performed, the size of the vector data samples, how to format the vector data samples, the specific mathematical functions, the address locations of lookup tables, etc. Thus, the fused vector processor instruction may contain fields that have been predetermined such that when compiled and transmitted to the execution unit 600, causes the execution unit 600 to perform a sequential number of vector processing operations on vector data samples retrieved from the one or more vector registers 302.1-302.2. The fused vector processor instruction may advantageously encode fields for frequently-executed vector processor operations that may have predictable outcomes, which may be with respect to the advancement of the read and write pointers after each vector processing operation using knowledge of the size of the vector data samples to be processed and information regarding the address range of the buffers 308.1-308.N. Moreover, the fused vector processor instruction may encode the fields to indicate vector processing operations that are typically repeated over a large number of vector data samples, which may be particularly useful for specific implementations as noted herein, such digital signal processing for wireless communications.

As noted below, in one illustrative scenario, the fused vector processor instruction may include a number of fields with respect to the computation of a non-linear term used in digital pre-distortion (DPD). The fused vector processor instruction includes a number of fields that facilitates vector processor operations that function to read a partially computed DPD result from an accumulator, compute an additional term, and accumulate this newly computed term $(r[i]=x[j]*f(|y[k]|))$ to the partial result, which is written back to the accumulator. The function $f(x)$ is evaluated using lookup tables with interpolation. Once the entire expression is computed, the result is scaled, rounded, and saturated if necessary and written to the vector output via the output vector format blocks 612A, 612B. The operation is controlled by ctrl0/ctrl1 inputs.

Thus, the fused vector processor instruction may have any suitable number of fields, with each field representing a number of corresponding bits that functions to instruct each corresponding block of the execution unit 600 that receives the fused vector processor instruction to perform specific tasks. Thus, the fused vector processor instruction may be executed by the processing circuitry 310.1-310.N of a corresponding execution unit 304.1-304.N in accordance with any suitable type of software language, machine code, opcode, etc. The various fields may have any suitable format depending upon the particular compiler and language used by the vector processor architecture 300. The fields illustrated in Table 1 below may be generated using the instruction sets stored in the program memory 306, which may be generated by the decoder 320 in accordance with a predetermined type of machine-readable code that is executed by the execution units 304.1-304.N in accordance with a predetermined machine-readable and executable software instruction set. The specific arrangement of bits represented by each field of the fused vector processor instruction may cause the execution units 304.1-304.N to execute specific vector processing operations. The first field of the vector processor instruction may include a control field such as ctrl:, which is indexed to the particular data vector being processed (such as 0, 1, 2, etc.)

Thus, a fused vector processor instruction may contain any suitable number of operands or fields, each representing a number of bits that encode a specific instruction in accordance with the particular vector processing operations to be performed. The general syntax for such a fused vector processor instruction may be represented as follows:

operation (<FU>, A, B, D, E, F, R, S, T);

The fused vector processor instruction thus functions to instruct a corresponding execution unit 304.1-304.N that receives the fused vector processor instruction to perform several vector processing operations. Thus, the fused vector processor instruction may be executed by the processing circuitry 310.1-310.N of a corresponding execution unit 304.1-304.N in accordance with any suitable type of software language, machine code, opcode, etc., which may be a set of predetermined software instructions, a hardware implementation, or combinations of both. The various fields on the fused vector processor instruction may have any suitable format depending upon the particular compiler and language used by the vector processor architecture 300. The instructions illustrated in Table 1 below may form part of the instruction sets stored in the program memory 306, which may be generated by the decoder 320 in accordance with a predetermined type of machine-readable code that is executed by the execution units 304.1-304.N in accordance with a predetermined machine-readable and executable software instruction set. The specific arrangement of bits represented by each operand of the vector processor instruction may cause the execution units 304.1-304.N to execute specific vector processing operations. The first operand of the fused vector processor instruction may include a control field such as ctrl:, which is indexed to the particular vector processor instruction (such as 0, 1, 2, etc.)

As one scenario, a fused vector processor instruction may be expressed as follows:

vec_inter_mac(ctrl0, ctrl1, vec_in0, vec_in1, vec_acc_in, vec_out, vec_acc_out);

The vector processor architecture as discussed herein may implement any suitable number of fused vector processor instructions having any suitable number of fields, with a sample or subset of some fields being represented in Table 1 below, with additional operands and fields shown in Tables 2-4. Of course, the vector processor architecture 300 may include alternate, additional, and fewer instructions, fields, operands, etc., depending upon the particular operation being performed and the particular application.

TABLE 1

| Instruction | Description |
| --- | --- |
| ctrl0: | Instruction Control 0 |
| ctrl1: | Instruction Control 1 |
| vec_in0: | Input vector of complex samples |
| vec_in1: | Input vector of complex sample magnitudes |
| vec_acc_in: | Input vector of partially accumulated results |
| coef_in: | Subset of filter coefficients used in current stage |
| vec_out: | Vector of DPD results |
| vec_acc_out: | Output vector of partially accumulated results |
| ctrl0[0:7]: | input vector data 0 read address (read pointer for vector 0) |
| ctrl0[8:15]: | input vector data 1 read address (read pointer for vector 1) |
| ctrl0[23:16]: | output vector data write address (write pointer) |
| ctrl0[27:24]: | LUT selection |
| ctrl0[30:28]: | LUT size (16/32/64/128 . . . # of segments) |
| ctrl0[31]: | write enable for final scaled result |
| ctrl1[2:0]: | multiplier configuration |
| | 000 - multiply |
| | 001 - multiply accumulate |
| | . . . |

Again, a fused vector processor instruction may contain any suitable number of operands, each encoding a specific instruction in accordance with the particular vector processing operation and implementation. Thus, the syntax for a FIR filter vector processor instruction may be represented as follows:

v_fir_filter (<FU>, A, B, D, E, F, R, S, T);

with <FU> being a specific field with respect to the particular compiler used to generate the instruction. Table 2 below summarizes a set of such operands, which are explained in further detail below.

TABLE 2

| Operand | Direction | C Type | Width (bits) | Cycle |
| --- | --- | --- | --- | --- |
| A | Input | unsigned int | 32 | 0 |
| B | Input | unsigned int | 32 | 0 |
| D | Input | _int1024 | 1024 | 0 |
| E | Input | _int1024 | 1024 | 0 |
| F | Input | _int2560 | 2560 | 4 |
| R | Output | _int1024 | 1024 | 6 |
| S | Output | _int1024 | 1024 | 6 |
| T | Output | _int2560 | 2560 | 4 |

Such a fused vector processing instruction may represent a vector FIR filter operation processor instruction and be utilized by one of the execution units 302.1-302.N to implement various kinds of FIR filters, including non-symmetric, anti-symmetric, symmetric filter, half band interpolation and decimation filter, etc. For symmetric filters, including anti-symmetric filters, symmetry may be exploited to reduce the multiplication number. Thus, for this operation, it is assumed that filter coefficients are pre-arranged and stored in an on-chip lookup table (LUT). The on-chip LUT size may be any suitable size depending upon the particular application, such as 1024×32 bits. The LUT may thus hold up to 2048 16-bit real coefficients in such a case.

Tables 3 and 4 further include various fields and their accompanying description, which may be implemented to perform filter computations as noted herein or any other suitable type of vector processing operations. Thus, continuing the above scenario, the input vectors D, E may each contain 32 bit vector data samples for a total of 64 consecutive vector data samples. Thus, when enabled, these 64 vector data samples are written into one local buffer 308.1-308.N (SBF) as a word (2048 bit wide), which is addressed by sbf_wr_ptr representing a write pointer as discussed herein. In this scenario, it is assumed that there are 8 such buffer words in the particular local buffer 308.1-308.N. The write into the local buffer 308 is thus word aligned, and therefore sbf_wr_ptr is only 3 bits. The sbf_wr_ptr field may thus represent a write pointer that identifies the starting location in the local buffer 308.1-308.N where data is to be written for further vector processing operations as discussed herein. The sbf_wr_enb field indicates, when enabled, that data is to be written into the local buffer 308.1-308.N (such as from the vector registers 302.1-30.N) as discussed herein. The fields sbf_rd_idx0, sbf_rd_idx1 may respectively represent read pointers identifying the starting location in the local buffer 308.1-308.N from which data is to be read, as discussed herein.

When enabled, the SBF read operation sbf_rd_enb results in an execution unit 304.1-304.N reading out two unaligned buffer words independently from a local buffer 308.1-308.N, which are indexed by sbf_r_idx0, sbf_r_idx1, respectively. These two 2048 bit words may be non-overlapped, partially overlapped, or completely-overlapped, depending on the values of sbf_r_idx0, sbf_r_idx1. To support such unaligned reads, both sbf_r_idx0 and sbf_r_idx1 are allocated 9 bits to be able to read from any 32 bit word position from the local buffer 308.1-308.N. These two read out buffer words are then sent to two sliding window creation (SWC) blocks to go through rotation/interleave-and-rotation and sliding window generation based on the filter types. Each SWC block generates four 32 component vectors, one for each filter coefficient. Usually, one SWC generates 4 vectors for a main data path, whereas the other SWC generates the other 4 vectors for the symmetric data path. Two main path vectors and two symmetric data path vectors are thus sent to a first multiplication block (such as 606A). The other two main path vectors and the other two symmetric data path vectors are sent to a second multiplication block.

Continuing this scenario, one vector is then read out from the on-chip LUT. Four 16 bit real or two 32 bit complex coefficients from the read out vector are cloned into two coefficient vectors. Each coefficient vector is fed to one multiplication block. The products from both multiplication blocks and the accumulation input F are then added together. The results are carried out by T.

Each execution of this operation may produce no filtered data sample (when only SBF write is enabled), 32, or 16 filtered data samples (when SBF read is enabled), depending on the filter type that is being implemented. After all filter coefficients have been applied to one set of data samples, the accumulated results are then processed through a shift-round-saturate (SRS) block (such as S610A) to convert to a normal precision format. Again, SRS is a common function in DSP for scaling fixed point data after arithmetic operations that result in data that no longer fits in the vector. Then, the data is packed into a packing register to wait for more samples. After 64 data samples are collected, filtered data sample processing is carried out by R and S. A and B represent pre-generated headers to control each filter operation.

The following dynamic fields are carried by A, B in each v_fir_filter operation:

TABLE 3

| Bit position | Size | Field Name | Definition |
|---|---|---|---|
| | 1 | sbf_wr_enb | SBF write enable. when set, data carried in D, E is written into SBF. |
| | 1 | sbf_rd_enb | SBF read enable. When set, two SBF words are read out, filter operation is performed. |
| | 1 | symm_enb | When set, symmetric path is enabled. |
| | 9 | sbf_rd_idx0 | SBF read index 0 (read pointer for vector 0) |
| | 9 | sbf_rd_idx1 | SBF read index 1 (read pointe for vector 1) |
| | 1 | pkr_enb | When set, on-chip packing Register enabled. |
| | 1 | pkr_we | When set and pkr_enb = 1, one packing register is written. |
| | 1 | pkr_idx | Packing register Index. May increase to 2 bits. |
| | 1 | pkr_pos | Packing register position to indicate first 16 or second 16 position. May increase to 2 bits if 4-to-1 reduction is needed. |
| | 2 | mac_type | 0 - No accumulation<br>1 - Add accumulation input<br>2 - subtract accumulation input<br>3 - un-supported |
| | 3 | sbf_wr_ptr | SBF write index (write pointer) |
| | 1 | mem_w_enb | When set, data will be written into VMEM |
| | 5 | output_fmt | Specify the output format operation |

The following fields are also used per-filter type, which may be loaded when no filter operation is performed (such as when sbf_wr_enb=1 and sbf_rd_enb=0).

TABLE 4

| Bit position | Size | Field Name | Definition |
|---|---|---|---|
| | 4 | fir_type | FIR filter types |
| | 5 | shift | scalar shift value for SRS |
| | 1 | sym_type | 0 - symmetric<br>1 - anti-symmetric |
| | 2 | mul_type | 0 - MUL REAL, real numbers multiplication<br>1 - MUL CPX, complex numbers multiplication<br>2 - MUL SEMI, a real number times a complex number<br>3 - MUL MAGS, complex number magnitude square |
| | 1 | mul_size | 0 - 16 bit mode<br>1 - 32 bit mode |
| | 1 | red_mode | 0 - No reduction<br>1 - 2-to-1 reduction<br>may need to increase to 2 bits |
| | 4 | coef_Lut_idx | Filter coefficient LUT index |
| | 5 | coef_idx | Filter coefficient component start index |

Thus, the vector processing operations as discussed herein may be implemented using a fused vector processor instruction that performs a for loop or other suitable control such that vector processing operations are iteratively executed, with the various fields for the individual vector processor instructions begin changed each pass through the for loop. Such fields thus dictate when data is to be written into the local buffers 308.1-308.N by each respective execution unit 302.1-302.N (sbf_wr_enb), the location within the local buffers 308.1-308.N where the data is to be written (sbf_wr_ptr), when data is to be read from the local buffers 308.1-308.N by each respective execution unit 302.1-302.N (sbf_rd_enb), the location within the local buffers 308.1-308.N from which the data is to be read (sbf_rd_idx0, sbf_rd_idx1, etc.), when data is to be written to the vector registers 302.1-302.N (mem_w_enb), etc.

Example C-Code to Implement a DPD Loop

The code snippet provided below is written in C, and all computations performed per for loop iteration (i.e. the number of vector processing operations executed for a particular fused vector processor instruction) are fused into a single V_INTRPL_MAC instruction.

```
// Loop to compute DPD on block of I/Q samples.
// Each iteration computes the contribution of one non-linear function to 2 vector outputs
// Hdr[0-3] stores all the precomputed control for each instruction call (pointers to data,
// pointers to LUT,
// multiplier configuration, etc.)
for (i=0; i<(N_DATA_VECTORS/2)*N_FUNCTIONS+4; i++)
    {
    // load the control information for 2 fused instructions into integer variables
    Hdr0 = *(hdr_ptr++);
    Hdr1 = *(hdr_ptr++);
    Hdr2 = *(hdr_ptr++);
    Hdr3 = *(hdr_ptr++);
    // load I/Q samples from memory at arbitrary offset
    V_LDOI_2048_0(data_ptr, ofst_x, vecX0, vecX1, ofst_x);
    // load magnitude of I/Q samples at arbitrary offset
    V_LDOI_2048_0(xbar_ptr, ofst_a, vecA0, vecA1, ofst_a);
```

```
    // read accumulator, compute an additional DPD term, add to accumulator, output scaled
    //result for vector 1
    V_INTRPL_MAC(Hdr0, Hdr1, vecX0, vecX1, ACC0, vecR0, ACC0);
    // read accumulator, compute an additional DPD term, add to accumulator, output scaled
    //result for vector 2
    V_INTRPL_MAC(Hdr2, Hdr3, vecA0, vecA1, ACC1, vecR1, ACC1);
    // MEM_W_ENB(Hdr1) indicates that final term has accumulated and result can be
    // written back to memory.
    if (MEM_W_ENB(Hdr1))
        V_STOI_2048_1(out_ptr, ofst_y, vecR0, vecR1, ofst_y);
}
```

Device Implementing a Vector Processor Architecture

Figure 8:
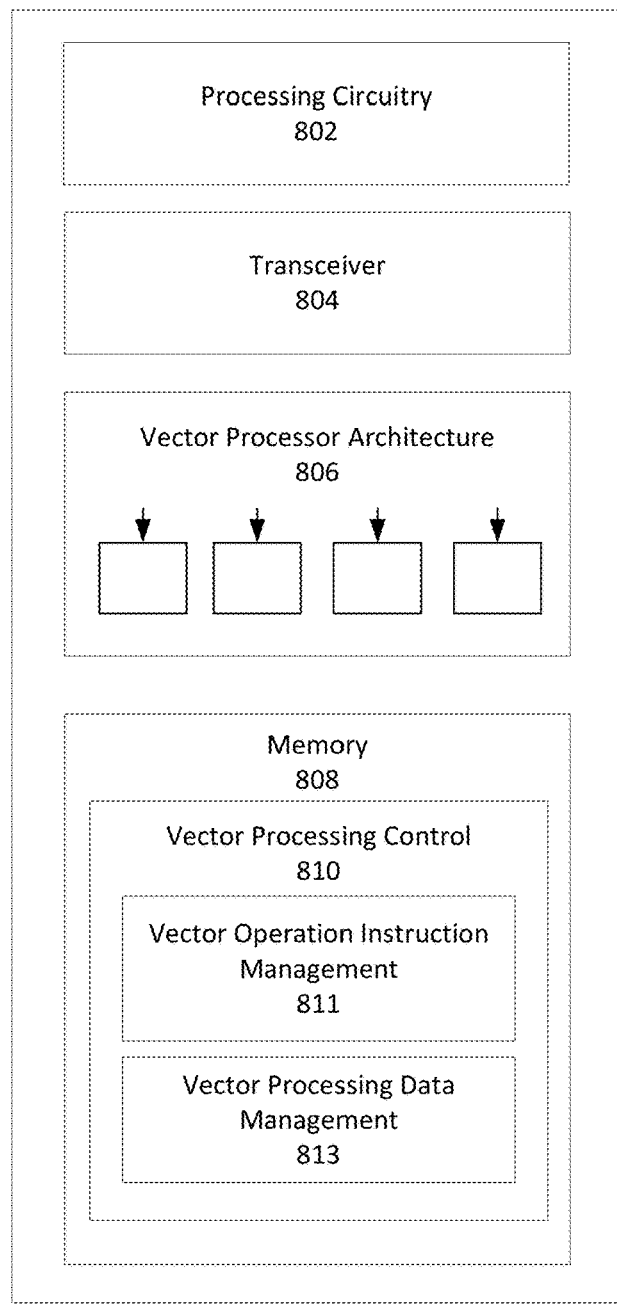
FIG. 8 illustrates an example device, in accordance with the disclosure.

FIG. 8 illustrates an example device, in accordance with the present disclosure. The device 800 may be identified with one or more devices implementing a vector processor architecture to perform vector processing operations, such as the vector processor architecture 300 as shown and discussed herein with reference to FIG. 3. The device 800 may be identified with a wireless device, a user equipment (UE) or other suitable device configured to perform wireless communications such as a mobile phone, a laptop computer, a cellular base station, a tablet, etc., which may include one or more components configured to transmit and receive radio signals, and to use vector processing operations as discussed herein to perform digital signal processing operations in accordance with wirelessly transmitted and/or received data, which may include filter processing, DFE processing, etc., as discussed herein. Alternatively, the device 800 may be identified with a graphics processing unit (GPU), which may perform graphic processing on streams of graphical data.

As further discussed below, the device 800 may perform the functions as discussed herein with respect to the vector processor architecture 300 as shown and discussed with respect to FIG. 3. The device 800 may perform vector processing operations by receiving fused vector processor instructions having any suitable number of fields that result in the execution of several vector processing operations. These vector processing operations may be performed using locally-implemented or embedded buffers to store vector data samples and the output of performing vector data processing on the stored vector data samples. To do so, the device 800 may include processing circuitry 802, a transceiver 804, a vector processor architecture 806, and a memory 808. The components shown in FIG. 8 are provided for ease of explanation, and the device 800 may implement additional, less, or alternative components as those shown in FIG. 8. In one scenario, the transceiver 804 may be omitted when the device 800 is implemented as a GPU.

The processing circuitry 802 may be configured as any suitable number and/or type of computer processors, which may function to control the device 700 and/or other components of the device 800. The processing circuitry 802 may be identified with one or more processors (or suitable portions thereof) implemented by the device 800. The processing circuitry 802 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 802 may be configured to carry out instructions to perform arithmetical, logical, and/or input/output (I/O) operations, and/or to control the operation of one or more components of device 800 to perform various functions as described herein. The processing circuitry 802 may include one or more microprocessor cores, memory registers, buffers, clocks, etc., and may generate electronic control signals associated with the components of the device 800 to control and/or modify the operation of these components. The processing circuitry 802 may communicate with and/or control functions associated with the transceiver 804, the vector processor architecture 806, and/or the memory 808.

The transceiver 804 (when present) may be implemented as any suitable number and/or type of components configured to transmit and/or receive data (such as data packets) and/or wireless signals in accordance with any suitable number and/or type of communication protocols. The transceiver 804 may include any suitable type of components to facilitate this functionality, including components associated with known transceiver, transmitter, and/or receiver operation, configurations, and implementations. Although depicted in FIG. 8 as a transceiver, the transceiver 804 may include any suitable number of transmitters, receivers, or combinations of these that may be integrated into a single transceiver or as multiple transceivers or transceiver modules. The transceiver 804 may include components typically identified with an RF front end and include antennas, ports, power amplifiers (PAs), RF filters, mixers, local oscillators (LOs), low noise amplifiers (LNAs), upconverters, downconverters, channel tuners, etc. Thus, the transceiver 804 may be configured as any suitable number and/or type of components configured to facilitate receiving and/or transmitting data and/or signals in accordance with one or more communication protocols. The transceiver 804 may be implemented as any suitable number and/or type of components to support wireless communications such as analog-to-digital converters (ADCs), digital to analog converters, intermediate frequency (IF) amplifiers and/or filters, modulators, demodulators, baseband processors, etc. The data received via the transceiver 804 (e.g. wireless signal data streams), data provided to the transceiver 804 for transmission (e.g. data streams for transmission), and/or data used in conjunction with the transmission and/or reception of data via the transceiver 804 (e.g. digital filter coefficients, DPD terms, etc.) may be processed as data streams via the vector processor architecture 806, as discussed herein. Thus, the vector processor architecture 806 may be identified with the vector processor architecture 300 as shown and described herein with reference to FIG. 3.

The memory 808 stores data and/or instructions such that, when the instructions are executed by the processing circuitry 802, cause the device 800 to perform various functions as described herein with respect to the vector processor architecture 806, such as controlling, monitoring, and/or regulating the flow of data through the vector processor architecture 806. The memory 808 may be implemented as any well-known volatile and/or non-volatile memory, including read-only memory (ROM), random access memory (RAM), flash memory, a magnetic storage media, an optical disc, erasable programmable read only memory (EPROM), programmable read only memory (PROM), etc. The memory 808 may be non-removable, removable, or a combination of both. The memory 808 may be implemented as a non-transitory computer readable medium storing one or more executable instructions such as, for example, logic, algorithms, code, etc.

As further discussed below, the instructions, logic, code, etc., stored in the memory 808 are represented by the various modules as shown, which may enable the functionality disclosed herein to be functionally realized. Alternatively, the modules as shown in FIG. 8 that are associated with the memory 808 may include instructions and/or code to facilitate control and/or monitor the operation of hardware components implemented via the device 800. In other words, the modules shown in FIG. 8 are provided for ease of explanation regarding the functional association between hardware and software components. Thus, the processing circuitry 802 may execute the instructions stored in these respective modules in conjunction with one or more hardware components to perform the various functions as discussed herein.

The vector processing control engine 810 may represent the functionality described herein as discussed with reference to controlling and/or monitoring the vector processor architecture 806. The vector processing control engine 810 may represent the program memory 306 (and stored instruction sets), the decoder 320, and/or the vector data memory 301 as discussed herein with reference to FIG. 3. Additionally or alternatively, one or more of the program memory 306, the decoder 320, and/or the vector data memory 301 may form part of the processing circuitry 802, the memory 808, or separate components not shown in FIG. 8.

The executable instructions stored in the vector operation instruction management module 811 may facilitate, in conjunction with execution via the processing circuitry 802, the device 800 receiving and decoding fused vector processor instructions (which may be sent via the processing circuitry 802 or other suitable component of the device 800 or a component external to the device 800), and providing data streams to the vector processor architecture 806 (e.g. from a suitable data source as discussed herein). This may include a determination of each specific vector processor instruction to perform specific types of vector processing operations and/or any of the functionality as discussed herein with respect to the vector processor architecture 300 such as the retrieval of vector data samples from vector registers 302.1-302.N, writing vector data samples to the local buffers 308.1-308.N, reading vector data samples from the local buffers 308.1-308.N, the calculations identified with various vector processing operations, writing the results of vector processing operation results to the local buffers 308.1-308.N, etc.

The executable instructions stored in the vector processing data management module 813 may facilitate, in conjunction with execution via the processing circuitry 802, the determination of when the calculated results of vector processing operations are completed and stored in the appropriate buffer 308.1-308.N of an execution unit 304.1-304.N. This may include writing the results in one or more vector registers 302.1-302.N and/or sending the vector data sample results to the vector data memory 301 and/or the I/O data to be utilized by the appropriate components of the device 800 or other suitable device.

General Operation of a Vector Processor Architecture and a Wireless Device

A vector processing unit is provided. With reference to FIG. 3, the vector processing unit includes a buffer configured to store a set of vector data samples that are retrieved from at least one vector register; and vector processing circuitry configured to perform, in response to receiving a fused vector processor instruction having a plurality of fields, a plurality of vector processing operations on the set of vector data samples read from the buffer. The vector processing instruction is received during a single clock cycle, and at least one respective one of the plurality of fields is associated with an individual vector processor instruction, the vector processing circuitry being configured to perform the plurality of vector processing operations in accordance with each of the individual vector processor instructions. The plurality of fields includes a read pointer indicating a starting address location in the buffer from which the set of vector data samples are read to begin performing the plurality of vector processing operations. In addition or in alternative to and in any combination with the optional features previously explained in this paragraph, the buffer comprises an input buffer and an output buffer, the plurality of vector data samples retrieved from the at least one vector register are stored in the input buffer, and results of the vector processing circuitry performing one of the plurality of vector processing operations on the stored set of vector data samples are stored in the output buffer. In addition or in alternative to and in any combination with the optional features previously explained in this paragraph, one of the plurality of fields of the fused vector processor instruction is a write pointer indicating a starting address location in the output buffer where the results of the vector processing circuitry performing one of the vector processing operations on the set of vector data samples are stored. In addition or in alternative to and in any combination with the optional features previously explained in this paragraph, the buffer comprises a first buffer, a second buffer, and a third buffer, the plurality of vector data samples retrieved from the at least one vector register are stored in the first buffer, and the vector processing circuitry is configured to (i) perform a first one of the plurality of vector processing operations on the set of vector data samples stored in the first buffer and write the results of performing the first vector processing operation to the second buffer, and (ii) perform a second one of the plurality of vector processing operations on the set of vector data samples stored in the second buffer and write the results of performing the second vector processing operation to the third buffer. In addition or in alternative to and in any combination with the optional features previously explained in this paragraph, the vector processor circuitry is configured to perform the plurality of vector processing operations without retrieving additional vector data samples from the at least one vector register. In addition or in alternative to and in any combination with the optional features previously explained in this paragraph, the plurality of vector processing operations are digital signal processing operations that are associated with wireless data communications.

A system on a chip (SoC) is provided. With reference to FIG. 3, the SoC includes a plurality of vector registers; and a plurality of vector processing units, each one of the plurality of vector processing units comprising: a buffer configured to store a set of vector data samples that are retrieved from at least one vector register; and vector processing circuitry configured to perform, in response to receiving a fused vector processor instruction having a plurality of fields, a plurality of vector processing operations on the set of vector data samples read from the buffer, wherein the vector processing instruction is received during a single clock cycle, and wherein at least one respective one of the plurality of fields is associated with an individual vector processor instruction, the vector processing circuitry being configured to perform the plurality of vector processing operations in accordance with each of the individual vector processor instructions. The plurality of fields includes a read pointer indicating a starting address location in the buffer from which the set of vector data samples are read to begin performing the plurality of vector processing operations. In addition or in alternative to and in any combination with the optional features previously explained in this paragraph, the buffer comprises an input buffer and an output buffer, the plurality of vector data samples retrieved from the at least one vector register are stored in the input buffer, and results of the vector processing circuitry performing one of the plurality of vector processing operations on the stored set of vector data samples are stored in the output buffer. In addition or in alternative to and in any combination with the optional features previously explained in this paragraph, one of the plurality of fields of the fused vector processor instruction is a write pointer indicating a starting address location in the output buffer where the results of the vector processing circuitry performing one of the vector processing operations on the set of vector data samples are stored. In addition or in alternative to and in any combination with the optional features previously explained in this paragraph, the buffer comprises a first buffer, a second buffer, and a third buffer, the plurality of vector data samples retrieved from the at least one vector register are stored in the first buffer, and the vector processing circuitry is configured to (i) perform a first one of the plurality of vector processing operations on the set of vector data samples stored in the first buffer and write the results of performing the first vector processing operation to the second buffer, and (ii) perform a second one of the plurality of vector processing operations on the set of vector data samples stored in the second buffer and write the results of performing the second vector processing operation to the third buffer. In addition or in alternative to and in any combination with the optional features previously explained in this paragraph, the vector processor circuitry is configured to perform the plurality of vector processing operations without retrieving additional vector data samples from the at least one vector register. In addition or in alternative to and in any combination with the optional features previously explained in this paragraph, the plurality of vector processing operations are digital signal processing operations that are associated with wireless data communications.

A wireless device is provided. With reference to FIG. 8, the wireless device includes a transceiver configured to wirelessly transmit and receive data; a plurality of vector registers; and a plurality of vector processing units, each one of the plurality of vector processing units comprising: a buffer configured to store a set of vector data samples that are retrieved from at least one vector register; and vector processing circuitry configured to perform, in response to receiving a fused vector processor instruction having a plurality of fields, a plurality of vector processing operations on the set of vector data samples read from the buffer, wherein the vector processing instruction is received during a single clock cycle, wherein at least one respective one of the plurality of fields is associated with an individual vector processor instruction, the vector processing circuitry being configured to perform the plurality of vector processing operations in accordance with each of the individual vector processor instructions, and wherein the plurality of vector processing operations are digital signal processing operations performed in accordance with data wirelessly transmitted or received via the transceiver. The plurality of fields includes a read pointer indicating a starting address location in the buffer from which the set of vector data samples are read to begin performing the plurality of vector processing operations. In addition or in alternative to and in any combination with the optional features previously explained in this paragraph, the buffer comprises an input buffer and an output buffer, the plurality of vector data samples retrieved from the at least one vector register are stored in the input buffer, and results of the vector processing circuitry performing one of the plurality of vector processing operations on the stored set of vector data samples are stored in the output buffer. In addition or in alternative to and in any combination with the optional features previously explained in this paragraph, one of the plurality of fields of the fused vector processor instruction is a write pointer indicating a starting address location in the output buffer where the results of the vector processing circuitry performing one of the vector processing operations on the set of vector data samples are stored. In addition or in alternative to and in any combination with the optional features previously explained in this paragraph, the buffer comprises a first buffer, a second buffer, and a third buffer, the plurality of vector data samples retrieved from the at least one vector register are stored in the first buffer, and the vector processing circuitry is configured to (i) perform a first one of the plurality of vector processing operations on the set of vector data samples stored in the first buffer and write the results of performing the first vector processing operation to the second buffer, and (ii) perform a second one of the plurality of vector processing operations on the set of vector data samples stored in the second buffer and write the results of performing the second vector processing operation to the third buffer. In addition or in alternative to and in any combination with the optional features previously explained in this paragraph, the vector processor circuitry is configured to perform the plurality of vector processing operations without retrieving additional vector data samples from the at least one vector register.

Process Flow

Figure 9:
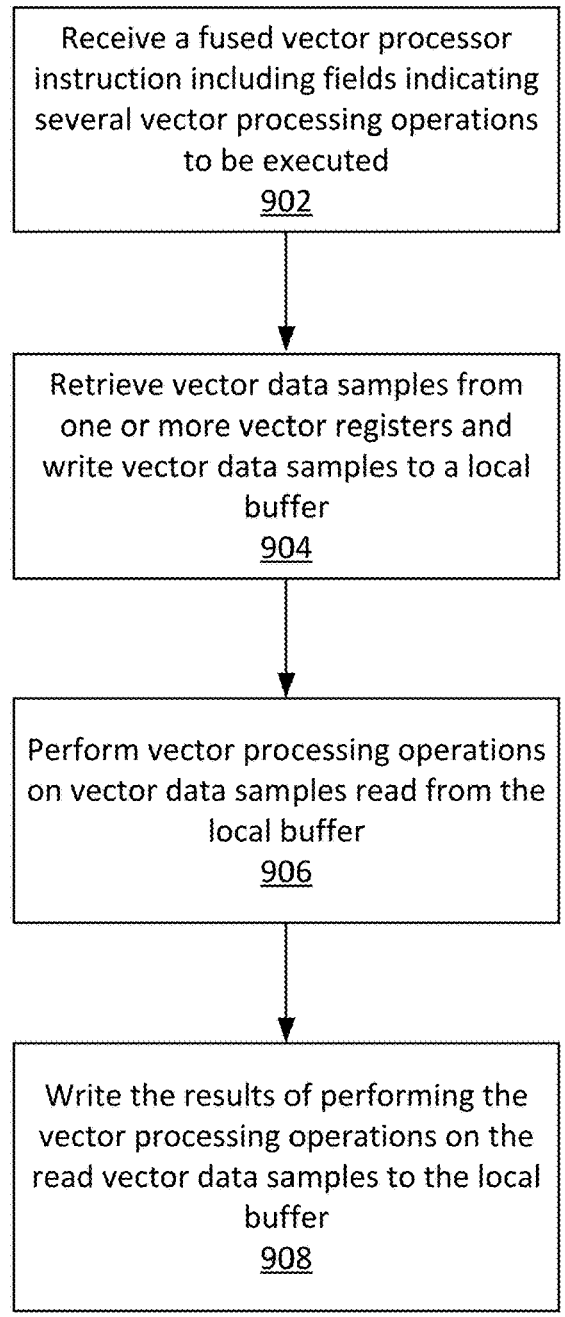
FIG. 9 illustrates a process flow, in accordance with the disclosure.

FIG. 9 illustrates a process flow. With reference to FIG. 9, the process flow 900 may be a computer-implemented method executed by and/or otherwise associated with one or more processors (processing circuitry) and/or storage devices. These processors and/or storage devices may be associated with one or more components of the vector processor architecture 300 as discussed herein and/or one or more components of the device 800 as discussed herein. The processors and/or storage devices may be identified with the one or more execution units 304.1-304.N and/or processor circuitry 310.1-310.N executing vector processor instructions. The flow 900 may include alternate or additional steps that are not shown in FIG. 9 for purposes of brevity, and may be performed in a different order than the steps shown in FIG. 9.

Flow 8900 may begin when one or more processors receive (block 902) a fused vector processor instruction includes several fields that indicate several individual vector processing operations to be performed (i.e. executed). This fused vector processor instruction may be received from any suitable component that implements the vector processor architecture as discussed herein.

Flow 900 may include one or more processors, in response to receiving the fused vector processor instruction, retrieving (block 904) vector data samples from one or more of the vector registers 302.1-302.N and writing (block 902)

the retrieved vector data samples to a local buffer (such as one of buffers 308.1-308.N) associated with an execution unit 304.1-304.N. These vector processing operations may be executed in accordance with the encoded data fields included in the fused vector processor instruction as noted herein.

Flow 900 may include one or more processors performing (block 906) vector processing operations on vector data samples read from a local buffer. This may include the use of the encoded data fields included in the fused vector processor instruction as noted herein, which may include a read pointer identifying the starting address location in the buffer from which the vector data samples are to be read. This may also include the one or more processors writing (block 908) the results of performing the vector processing operations on the read vector data samples to the buffer. This may include the encoded data fields included in the fused vector processor instruction as noted herein, which may include a write pointer identifying the starting address location in the buffer to which the vector data samples are to be written. Again, any suitable number of vector processing operations may be performed via the use of subsequent vector processor instructions, as discussed herein, such that several vector processing operations may be executed for a single fused vector processor instruction using the local execution unit buffers 308.1-308.N as discussed herein.

EXAMPLES

The following examples pertain to various techniques of the present disclosure.

An example (e.g. example 1) relates to a vector processing unit. The vector processing unit includes a buffer configured to store a set of vector data samples that are retrieved from at least one vector register; and vector processing circuitry configured to perform, in response to receiving a fused vector processor instruction having a plurality of fields, a plurality of vector processing operations on the set of vector data samples read from the buffer. The vector processing instruction is received during a single clock cycle, and at least one respective one of the plurality of fields is associated with an individual vector processor instruction, the vector processing circuitry being configured to perform the plurality of vector processing operations in accordance with each of the individual vector processor instructions.

Another example (e.g. example 2) relates to a previously-described example (e.g. example 1), wherein the plurality of fields includes a read pointer indicating a starting address location in the buffer from which the set of vector data samples are read to begin performing the plurality of vector processing operations.

Another example (e.g. example 3) relates to a previously-described example (e.g. one or more of examples 1-2), wherein the buffer comprises an input buffer and an output buffer, the plurality of vector data samples retrieved from the at least one vector register are stored in the input buffer, and results of the vector processing circuitry performing one of the plurality of vector processing operations on the stored set of vector data samples are stored in the output buffer.

Another example (e.g. example 4) relates to a previously-described example (e.g. one or more of examples 1-3), wherein one of the plurality of fields of the fused vector processor instruction is a write pointer indicating a starting address location in the output buffer where the results of the vector processing circuitry performing one of the vector processing operations on the set of vector data samples are stored.

Another example (e.g. example 5) relates to a previously-described example (e.g. one or more of examples 1-4), wherein the buffer comprises a first buffer, a second buffer, and a third buffer, the plurality of vector data samples retrieved from the at least one vector register are stored in the first buffer, and the vector processing circuitry is configured to (i) perform a first one of the plurality of vector processing operations on the set of vector data samples stored in the first buffer and write the results of performing the first vector processing operation to the second buffer, and (ii) perform a second one of the plurality of vector processing operations on the set of vector data samples stored in the second buffer and write the results of performing the second vector processing operation to the third buffer.

Another example (e.g. example 6) relates to a previously-described example (e.g. one or more of examples 1-5), wherein the vector processor circuitry is configured to perform the plurality of vector processing operations without retrieving additional vector data samples from the at least one vector register.

Another example (e.g. example 7) relates to a previously-described example (e.g. one or more of examples 1-6), wherein the plurality of vector processing operations are digital signal processing operations that are associated with wireless data communications.

An example (e.g. example 8) relates to a system on a chip (SoC). The SoC includes a plurality of vector registers; and a plurality of vector processing units, each one of the plurality of vector processing units comprising: a buffer configured to store a set of vector data samples that are retrieved from at least one vector register; and vector processing circuitry configured to perform, in response to receiving a fused vector processor instruction having a plurality of fields, a plurality of vector processing operations on the set of vector data samples read from the buffer, wherein the vector processing instruction is received during a single clock cycle, and wherein at least one respective one of the plurality of fields is associated with an individual vector processor instruction, the vector processing circuitry being configured to perform the plurality of vector processing operations in accordance with each of the individual vector processor instructions.

Another example (e.g. example 9) relates to a previously-described example (e.g. example 8), wherein the plurality of fields includes a read pointer indicating a starting address location in the buffer from which the set of vector data samples are read to begin performing the plurality of vector processing operations.

Another example (e.g. example 10) relates to a previously-described example (e.g. one or more of examples 8-9), wherein: the buffer comprises an input buffer and an output buffer, the plurality of vector data samples retrieved from the at least one vector register are stored in the input buffer, and results of the vector processing circuitry performing one of the plurality of vector processing operations on the stored set of vector data samples are stored in the output buffer.

Another example (e.g. example 11) relates to a previously-described example (e.g. one or more of examples 8-10), wherein one of the plurality of fields of the fused vector processor instruction is a write pointer indicating a starting address location in the output buffer where the results of the vector processing circuitry performing one of the vector processing operations on the set of vector data samples are stored.

Another example (e.g. example 12) relates to a previously-described example (e.g. one or more of examples 8-11), wherein: the buffer comprises a first buffer, a second buffer, and a third buffer, the plurality of vector data samples retrieved from the at least one vector register are stored in the first buffer, and the vector processing circuitry is configured to (i) perform a first one of the plurality of vector processing operations on the set of vector data samples stored in the first buffer and write the results of performing the first vector processing operation to the second buffer, and (ii) perform a second one of the plurality of vector processing operations on the set of vector data samples stored in the second buffer and write the results of performing the second vector processing operation to the third buffer.

Another example (e.g. example 13) relates to a previously-described example (e.g. one or more of examples 8-12), wherein the vector processor circuitry is configured to perform the plurality of vector processing operations without retrieving additional vector data samples from the at least one vector register.

Another example (e.g. example 14) relates to a previously-described example (e.g. one or more of examples 8-13), wherein the plurality of vector processing operations are digital signal processing operations that are associated with wireless data communications.

An example (e.g. example 15) relates to wireless device. The wireless device includes a transceiver configured to wirelessly transmit and receive data; a plurality of vector registers; and a plurality of vector processing units, each one of the plurality of vector processing units comprising: a buffer configured to store a set of vector data samples that are retrieved from at least one vector register; and vector processing circuitry configured to perform, in response to receiving a fused vector processor instruction having a plurality of fields, a plurality of vector processing operations on the set of vector data samples read from the buffer, wherein the vector processing instruction is received during a single clock cycle, wherein at least one respective one of the plurality of fields is associated with an individual vector processor instruction, the vector processing circuitry being configured to perform the plurality of vector processing operations in accordance with each of the individual vector processor instructions, and wherein the plurality of vector processing operations are digital signal processing operations performed in accordance with data wirelessly transmitted or received via the transceiver.

Another example (e.g. example 16) relates to a previously-described example (e.g. example 15), wherein the plurality of fields includes a read pointer indicating a starting address location in the buffer from which the set of vector data samples are read to begin performing the plurality of vector processing operations.

Another example (e.g. example 17) relates to a previously-described example (e.g. one or more of examples 15-16), wherein: the buffer comprises an input buffer and an output buffer, the plurality of vector data samples retrieved from the at least one vector register are stored in the input buffer, and results of the vector processing circuitry performing one of the plurality of vector processing operations on the stored set of vector data samples are stored in the output buffer.

Another example (e.g. example 18) relates to a previously-described example (e.g. one or more of examples 15-17), wherein one of the plurality of fields of the fused vector processor instruction is a write pointer indicating a starting address location in the output buffer where the results of the vector processing circuitry performing one of the vector processing operations on the set of vector data samples are stored.

Another example (e.g. example 19) relates to a previously-described example (e.g. one or more of examples 15-18), wherein: the buffer comprises a first buffer, a second buffer, and a third buffer, the plurality of vector data samples retrieved from the at least one vector register are stored in the first buffer, and the vector processing circuitry is configured to (i) perform a first one of the plurality of vector processing operations on the set of vector data samples stored in the first buffer and write the results of performing the first vector processing operation to the second buffer, and (ii) perform a second one of the plurality of vector processing operations on the set of vector data samples stored in the second buffer and write the results of performing the second vector processing operation to the third buffer.

Another example (e.g. example 20) relates to a previously-described example (e.g. one or more of examples 15-19), wherein the vector processor circuitry is configured to perform the plurality of vector processing operations without retrieving additional vector data samples from the at least one vector register.

An example (e.g. example 21) relates to a vector processing unit. The vector processing unit includes a buffer means for storing a set of vector data samples that are retrieved from at least one vector register means; and vector processing means for performing, in response to receiving a fused vector processor instruction having a plurality of fields, a plurality of vector processing operations on the set of vector data samples read from the buffer means. The vector processing instruction is received during a single clock cycle, and at least one respective one of the plurality of fields is associated with an individual vector processor instruction, the vector processing means performing the plurality of vector processing operations in accordance with each of the individual vector processor instructions.

Another example (e.g. example 22) relates to a previously-described example (e.g. example 21), wherein the plurality of fields includes a read pointer indicating a starting address location in the buffer means from which the set of vector data samples are read to begin performing the plurality of vector processing operations.

Another example (e.g. example 23) relates to a previously-described example (e.g. one or more of examples 21-22), wherein the buffer means comprises an input buffer and an output buffer, the plurality of vector data samples retrieved from the at least one vector register means are stored in the input buffer, and results of the vector processing means performing one of the plurality of vector processing operations on the stored set of vector data samples are stored in the output buffer.

Another example (e.g. example 24) relates to a previously-described example (e.g. one or more of examples 21-23), wherein one of the plurality of fields of the fused vector processor instruction is a write pointer indicating a starting address location in the output buffer where the results of the vector processing means performing one of the vector processing operations on the set of vector data samples are stored.

Another example (e.g. example 25) relates to a previously-described example (e.g. one or more of examples 21-24), wherein the buffer means comprises a first buffer, a second buffer, and a third buffer, the plurality of vector data samples retrieved from the at least one vector register means are stored in the first buffer, and the vector processing means (i) performs a first one of the plurality of vector processing operations on the set of vector data samples stored in the first buffer and writes the results of performing the first vector processing operation to the second buffer, and (ii) performs a second one of the plurality of vector processing operations on the set of vector data samples stored in the second buffer and writes the results of performing the second vector processing operation to the third buffer.

Another example (e.g. example 26) relates to a previously-described example (e.g. one or more of examples 21-25), wherein the vector processor means performs the plurality of vector processing operations without retrieving additional vector data samples from the at least one vector register means.

Another example (e.g. example 27) relates to a previously-described example (e.g. one or more of examples 21-26), wherein the plurality of vector processing operations are digital signal processing operations that are associated with wireless data communications.

An example (e.g. example 28) relates to a system on a chip (SoC). The SoC includes a plurality of vector register means; and a plurality of vector processing units, each one of the plurality of vector processing units comprising: a buffer means for storing a set of vector data samples that are retrieved from at least one vector register means; and vector processing means for performing, in response to receiving a fused vector processor instruction having a plurality of fields, a plurality of vector processing operations on the set of vector data samples read from the buffer means, wherein the vector processing instruction is received during a single clock cycle, and wherein at least one respective one of the plurality of fields is associated with an individual vector processor instruction, the vector processing means performing the plurality of vector processing operations in accordance with each of the individual vector processor instructions.

Another example (e.g. example 29) relates to a previously-described example (e.g. example 28), wherein the plurality of fields includes a read pointer indicating a starting address location in the buffer means from which the set of vector data samples are read to begin performing the plurality of vector processing operations.

Another example (e.g. example 30) relates to a previously-described example (e.g. one or more of examples 28-29), wherein: the buffer means comprises an input buffer and an output buffer, the plurality of vector data samples retrieved from the at least one vector register means are stored in the input buffer, and results of the vector processing means performing one of the plurality of vector processing operations on the stored set of vector data samples are stored in the output buffer.

Another example (e.g. example 31) relates to a previously-described example (e.g. one or more of examples 28-30), wherein one of the plurality of fields of the fused vector processor instruction is a write pointer indicating a starting address location in the output buffer where the results of the vector processing means performing one of the vector processing operations on the set of vector data samples are stored.

Another example (e.g. example 32) relates to a previously-described example (e.g. one or more of examples 28-31), wherein: the buffer means comprises a first buffer, a second buffer, and a third buffer, the plurality of vector data samples retrieved from the at least one vector register means are stored in the first buffer, and the vector processing means (i) performs a first one of the plurality of vector processing operations on the set of vector data samples stored in the first buffer and writes the results of performing the first vector processing operation to the second buffer, and (ii) performs a second one of the plurality of vector processing operations on the set of vector data samples stored in the second buffer and writes the results of performing the second vector processing operation to the third buffer.

Another example (e.g. example 33) relates to a previously-described example (e.g. one or more of examples 28-32), wherein the vector processor means performs the plurality of vector processing operations without retrieving additional vector data samples from the at least one vector register means.

Another example (e.g. example 34) relates to a previously-described example (e.g. one or more of examples 28-33), wherein the plurality of vector processing operations are digital signal processing operations that are associated with wireless data communications.

An example (e.g. example 35) relates to wireless device. The wireless device includes a transceiver means for wirelessly transmitting and receiving data; a plurality of vector register means; and a plurality of vector processing units, each one of the plurality of vector processing units comprising: a buffer means for storing a set of vector data samples that are retrieved from at least one vector register; and vector processing means for performing, in response to receiving a fused vector processor instruction having a plurality of fields, a plurality of vector processing operations on the set of vector data samples read from the buffer, wherein the vector processing instruction is received during a single clock cycle, wherein at least one respective one of the plurality of fields is associated with an individual vector processor instruction, the vector processing means performing the plurality of vector processing operations in accordance with each of the individual vector processor instructions, and wherein the plurality of vector processing operations are digital signal processing operations performed in accordance with data wirelessly transmitted or received via the transceiver means.

Another example (e.g. example 36) relates to a previously-described example (e.g. example 35), wherein the plurality of fields includes a read pointer indicating a starting address location in the buffer from which the set of vector data samples are read to begin performing the plurality of vector processing operations.

Another example (e.g. example 37) relates to a previously-described example (e.g. one or more of examples 35-36), wherein: the buffer means comprises an input buffer and an output buffer, the plurality of vector data samples retrieved from the at least one vector register means are stored in the input buffer, and results of the vector processing means performing one of the plurality of vector processing operations on the stored set of vector data samples are stored in the output buffer.

Another example (e.g. example 38) relates to a previously-described example (e.g. one or more of examples 35-37), wherein one of the plurality of fields of the fused vector processor instruction is a write pointer indicating a starting address location in the output buffer where the results of the vector processing means performing one of the vector processing operations on the set of vector data samples are stored.

Another example (e.g. example 39) relates to a previously-described example (e.g. one or more of examples 35-38), wherein: the buffer means comprises a first buffer, a second buffer, and a third buffer, the plurality of vector data samples retrieved from the at least one vector register means are stored in the first buffer, and the vector processing means (i) performs a first one of the plurality of vector processing operations on the set of vector data samples stored in the first buffer and writes the results of performing the first vector processing operation to the second buffer, and (ii) performs a second one of the plurality of vector processing operations on the set of vector data samples stored in the second buffer and writes the results of performing the second vector processing operation to the third buffer.

Another example (e.g. example 40) relates to a previously-described example (e.g. one or more of examples 35-39), wherein the vector processor means performs the plurality of vector processing operations without retrieving additional vector data samples from the at least one vector register means.

An apparatus as shown and described.

A method as shown and described.

CONCLUSION

The aforementioned description will so fully reveal the general nature of the disclosure that others can, by applying knowledge within the skill of the art, readily modify and/or adapt for various applications without undue experimentation, and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one implementation," "an implementation," "an exemplary implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The implementation described herein are provided for illustrative purposes, and are not limiting. Other implementation are possible, and modifications may be made to the described implementations. Therefore, the specification is not meant to limit the disclosure. Rather, the scope of the disclosure is defined only in accordance with the following claims and their equivalents.

The implementations described herein may be facilitated in hardware (e.g., circuits), firmware, software, or any combination thereof. Implementations may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to implementations described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the implementations described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A vector processing unit, comprising:
   a buffer configured to store a set of vector data samples that are retrieved from at least one vector register; and
   vector processing circuitry configured to perform, in response to receiving a fused vector processor instruction having a plurality of fields, a plurality of vector processing operations on the set of vector data samples read from the buffer,
   wherein the vector processing instruction is received during a single clock cycle,
   wherein at least one respective one of the plurality of fields is associated with an individual vector processor instruction, the vector processing circuitry being configured to perform the plurality of vector processing operations in accordance with each of the individual vector processor instructions,
   wherein the buffer comprises a first buffer, a second buffer, and a third buffer,
   wherein the set of vector data samples retrieved from the at least one vector register are stored in the first buffer, and
   wherein the vector processing circuitry is configured to (i) perform a first one of the plurality of vector processing operations on the set of vector data samples stored in the first buffer and write results of performing the first vector processing operation to the second buffer, and (ii) perform a second one of the plurality of vector processing operations on the set of vector data samples stored in the second buffer and write results of performing the second vector processing operation to the third buffer.

2. The vector processing unit of claim 1, wherein the plurality of fields include a read pointer indicating a starting address location in the buffer from which the set of vector data samples are read to begin performing the plurality of vector processing operations.

3. The vector processing unit of claim 1, wherein:
the first buffer comprises an input buffer and the second buffer comprises an output buffer,
the set of vector data samples retrieved from the at least one vector register are stored in the input buffer, and
results of the vector processing circuitry performing one of the plurality of vector processing operations on the stored set of vector data samples are stored in the output buffer.

4. The vector processing unit of claim 3, wherein one of the plurality of fields of the fused vector processor instruction is a write pointer indicating a starting address location in the output buffer where the results of the vector processing circuitry performing one of the vector processing operations on the set of vector data samples are stored.

5. The vector processing unit of claim 1, wherein the vector processor circuitry is configured to perform the plurality of vector processing operations without retrieving additional vector data samples from the at least one vector register.

6. The vector processing unit of claim 1, wherein the plurality of vector processing operations are digital signal processing operations that are associated with wireless data communications.

7. A system on a chip (SoC), comprising:
a plurality of vector registers; and
a plurality of vector processing units, each one of the plurality of vector processing units comprising:
a buffer configured to store a set of vector data samples that are retrieved from at least one vector register; and
vector processing circuitry configured to perform, in response to receiving a fused vector processor instruction having a plurality of fields, a plurality of vector processing operations on the set of vector data samples read from the buffer,
wherein the vector processing instruction is received during a single clock cycle,
wherein at least one respective one of the plurality of fields is associated with an individual vector processor instruction, the vector processing circuitry being configured to perform the plurality of vector processing operations in accordance with each of the individual vector processor instructions,
wherein the buffer comprises a first buffer, a second buffer, and a third buffer,
wherein the set of vector data samples retrieved from the at least one vector register are stored in the first buffer, and
wherein the vector processing circuitry is configured to (i) perform a first one of the plurality of vector processing operations on the set of vector data samples stored in the first buffer and write results of performing the first vector processing operation to the second buffer, and (ii) perform a second one of the plurality of vector processing operations on the set of vector data samples stored in the second buffer and write results of performing the second vector processing operation to the third buffer.

8. The SoC of claim 7, wherein the plurality of fields include a read pointer indicating a starting address location in the buffer from which the set of vector data samples are read to begin performing the plurality of vector processing operations.

9. The SoC of claim 7, wherein:
the first buffer comprises an input buffer and the second buffer comprises an output buffer,
the set of vector data samples retrieved from the at least one vector register are stored in the input buffer, and
results of the vector processing circuitry performing one of the plurality of vector processing operations on the stored set of vector data samples are stored in the output buffer.

10. The SoC of claim 9, wherein one of the plurality of fields of the fused vector processor instruction is a write pointer indicating a starting address location in the output buffer where the results of the vector processing circuitry performing one of the vector processing operations on the set of vector data samples are stored.

11. The SoC of claim 7, wherein the vector processor circuitry is configured to perform the plurality of vector processing operations without retrieving additional vector data samples from the at least one vector register.

12. The SoC of claim 7, wherein the plurality of vector processing operations are digital signal processing operations that are associated with wireless data communications.

13. A wireless device, comprising:
a transceiver configured to wirelessly transmit and receive data;
a plurality of vector registers; and
a plurality of vector processing units, each one of the plurality of vector processing units comprising:
a buffer configured to store a set of vector data samples that are retrieved from at least one vector register; and
vector processing circuitry configured to perform, in response to receiving a fused vector processor instruction having a plurality of fields, a plurality of vector processing operations on the set of vector data samples read from the buffer,
wherein the vector processing instruction is received during a single clock cycle,
wherein at least one respective one of the plurality of fields is associated with an individual vector processor instruction, the vector processing circuitry being configured to perform the plurality of vector processing operations in accordance with each of the individual vector processor instructions, and
wherein the plurality of vector processing operations are digital signal processing operations performed in accordance with data wirelessly transmitted or received via the transceiver,
wherein the buffer comprises a first buffer, a second buffer, and a third buffer,
wherein the set of vector data samples retrieved from the at least one vector register are stored in the first buffer, and
wherein the vector processing circuitry is configured to (i) perform a first one of the plurality of vector processing operations on the set of vector data samples stored in the first buffer and write results of performing the first vector processing operation to the second buffer, and (ii) perform a second one of the plurality of vector processing operations on the set of vector data samples stored in the second buffer and write results of performing the second vector processing operation to the third buffer.

14. The wireless device of claim 13, wherein the plurality of fields include a read pointer indicating a starting address location in the buffer from which the set of vector data samples are read to begin performing the plurality of vector processing operations.

15. The wireless device of claim 13, wherein:
the first buffer comprises an input buffer and the second buffer comprises an output buffer,
the set of vector data samples retrieved from the at least one vector register are stored in the input buffer, and
results of the vector processing circuitry performing one of the plurality of vector processing operations on the stored set of vector data samples are stored in the output buffer.

16. The wireless device of claim 15, wherein one of the plurality of fields of the fused vector processor instruction is a write pointer indicating a starting address location in the output buffer where the results of the vector processing circuitry performing one of the vector processing operations on the set of vector data samples are stored.

17. The wireless device of claim 13, wherein the vector processor circuitry is configured to perform the plurality of vector processing operations without retrieving additional vector data samples from the at least one vector register.

\* \* \* \* \*